US011859751B2

United States Patent
Kozak

(10) Patent No.: US 11,859,751 B2
(45) Date of Patent: Jan. 2, 2024

(54) CLOSURE FOR PRESSURE VESSEL OR PIPELINE

(71) Applicant: In-Line Flow Products Ltd., Edmonton (CA)

(72) Inventor: Keith Alan Kozak, Sherwood Park (CA)

(73) Assignee: In-Line Flow Products Ltd., Edmonton (CA)

( * ) Notice: Subject to any disclaimer, the term of this patent is extended or adjusted under 35 U.S.C. 154(b) by 279 days.

(21) Appl. No.: 16/884,885

(22) Filed: May 27, 2020

(65) Prior Publication Data
US 2021/0372553 A1  Dec. 2, 2021

(30) Foreign Application Priority Data

May 23, 2020  (CA) ................................ CA 3081278

(51) Int. Cl.
| | | |
|---|---|---|
| *F16L 55/115* | (2006.01) | |
| *B65D 45/34* | (2006.01) | |
| *B65D 45/32* | (2006.01) | |
| *F16J 13/12* | (2006.01) | |

(52) U.S. Cl.
CPC .......... *F16L 55/115* (2013.01); *B65D 45/325* (2013.01); *B65D 45/345* (2013.01); *F16J 13/12* (2013.01)

(58) Field of Classification Search
CPC .... B65D 45/345; B65D 45/34; B65D 45/325; F16L 55/115; F16L 55/1157; F16J 13/12
USPC ....................................................... 220/324
See application file for complete search history.

(56) References Cited

U.S. PATENT DOCUMENTS

| | | | |
|---|---|---|---|
| 4,108,327 A | * | 8/1978 | Shonerd .................... F17C 1/00 137/67 |
| 4,515,287 A | | 5/1985 | Baudoux et al. |
| 4,658,529 A | | 4/1987 | Bertolini |
| 5,318,509 A | | 6/1994 | Agbodoe |
| 7,210,201 B2 | | 5/2007 | Maeckle et al. |
| 7,213,848 B2 | | 5/2007 | Hagan |
| 7,326,092 B2 | | 2/2008 | Fedder et al. |
| 7,850,214 B2 | | 12/2010 | Ambriiz |
| 8,402,612 B2 | | 3/2013 | Wein et al. |
| 8,540,103 B2 | | 9/2013 | Lollis et al. |

(Continued)

FOREIGN PATENT DOCUMENTS

| | | |
|---|---|---|
| DE | 102008011462 | 9/2009 |
| DE | 102012204711 | 9/2013 |

*Primary Examiner* — Robert Poon
(74) *Attorney, Agent, or Firm* — FOLEY & LARDNER LLP

(57) ABSTRACT

A closure is provided for a pressure vessel or pipelines that can provide quick and easy access to the interior of a pressure vessel or pipeline and means for a pressure tight seal between the hub and door. The closure can incorporate means for mechanically fastening the door to the hub using an external split clamp ring actuated by a toggle mechanism. A locking mechanism can be provided to safeguard against unintended closure actuation and provides a layer of redundancy to the holding characteristics of the toggle mechanism. The locking mechanism can be interlocked to a pressure alert system to ensure any differential pressure condition contained within the closure is detected prior to disengaging the locking mechanism and actuating the toggle mechanism.

24 Claims, 19 Drawing Sheets

(56) References Cited

U.S. PATENT DOCUMENTS

| | | |
|---|---|---|
| 8,740,208 B2 | 6/2014 | Hagan et al. |
| 8,820,565 B2 | 9/2014 | Akhund et al. |
| 8,967,415 B2 | 3/2015 | Lang et al. |
| 2008/0289380 A1 | 11/2008 | Blattmann |
| 2011/0068590 A1 | 3/2011 | Teng |
| 2015/0059445 A1* | 3/2015 | Tragsdorf ............... G01M 3/04 220/378 |
| 2016/0201825 A1* | 7/2016 | O'Brien ................ F16L 35/00 70/177 |
| 2018/0010724 A1* | 1/2018 | Kozak .................... F16L 55/11 |

* cited by examiner

CLOSURE FOR PRESSURE VESSEL OR PIPELINE

CROSS REFERENCE TO RELATED APPLICATIONS

This patent application claims the benefit of Canada Patent Application Serial Number 3081278 filed 23 May 2020; which is hereby incorporated by reference in its entirety.

TECHNICAL FIELD

The present disclosure is related to the field of quick actuating closures for providing rapid access to, and sealing the end of, a pressure vessel or pipeline, in particular, to clamp-style closures with an improved means of safeguarding against unintentional operation and providing an element of redundancy in retaining the holding elements.

BACKGROUND

There have been many variations in the design of quick actuating closures over the last many decades. Most provide a means for rapid access to a pressure vessel or pipeline as compared to bolted flange connections. They employ various means to seal and support the end load created by internal and external pressures including screw threads whereby external threads on a hub interconnect with the internal threads of the door, conical bands whereby a split or segmented band is actuated into an annular groove between the hub and door, bayonet connections whereby interlocking segments of the hub are engaged with mating segments of the door by partial rotation and clamps whereby a split clamp ring is engaged on raised collar on the hub and door and are held together by toggles, bolts or other mechanisms.

In applicant's U.S. Pat. No. 10,550,940, the closure described therein uses a locking pin that must be completely removed from the assembly in order to manipulate the toggle linkages to unlock the split ring clamps and open the closure door. This can be problematic as there may be insufficient room or clearance behind the closure mechanism to remove the locking pin completely. Furthermore, even if the locking pin can be removed, it is possible that the locking pin can be dropped, damaged or become misplaced. If the locking pin is completely removed and subsequently not replaced, the safety aspect of the locking pin interfering with insertion of the pressure alert stem would be circumvented and the closure can be closed and pressurized without having the locking pin in place.

It is, therefore, desirable to provide a quick clamping mechanism that overcomes the shortcomings of the prior art.

SUMMARY

The present disclosure deals with the clamp ring style of closure. In some embodiments, an annular hub can be attached to the mating pressure vessel or pipeline and can function as an access port to the interior of the pressure chamber. A door can be sized to match the mating dimensions of the hub and provides a means to close access to the pressure vessel or pipeline. In some embodiments, both the hub and door can have a raised annular collar located at each end of their respective contacting surfaces. A hinge arrangement can be attached to both the hub and door to allow for pivoting the contact surfaces of the door to align with the contact surfaces of the stationary hub. After the surfaces are drawn together in opposition, two halves of a split annular ring can be rotated via hinge arrangement over the hub/door flange, with the ends drawn together with a toggle mechanism.

Once the toggle mechanism has been fully actuated, circular openings contained within the toggle linkages, and circular openings within the blocks attaching the toggle mechanism to the split annular ring, can align linearly. This linear arrangement can allow the passage of a locking pin of largely round cross section to pass axially through the circular openings, thereby locking the split annular rings and toggle mechanism in the closed position.

In some embodiments, the pressure alert stem can be sealed against the threaded bushing by means of an elastomer o-ring. The threaded portion of the pressure alert stem can be interrupted by an axial slot extended the entire length of the thread to a depth below the minor diameter of the thread. This can act as a safety feature in that if the interior portion of the hub is under differential pressure, and if an attempt is made to remove the pressure alert stem from the threaded bushing, the seal created by the o-ring would be compromised and the interior pressure contained within the hub would pass unobstructed through the thread groove, alerting the operator of a differential pressure situation with the closure assembly.

When fully assembled with the locking pin fully inserted and locking the toggle linkages, the pressure alert stem can be installed, which physically blocks the locking pin from translating outward and unlocking the toggle linkages thereby maintaining the toggle linkages and split annular rings in the closed and locked position. As a consequence, in order to operate the toggle mechanism to open the closure door, the pressure alert stem must be removed completely from the closure assembly in order for the locking pin to be translated linearly out of the toggle hole alignment. This embodiment constitutes a safety feature of the closure in that the pressure alert stem must be removed, thus alerting the operator of differential pressure within the closure hub, before the locking pin can be removed to allow the toggle mechanism to function and, thus, opening the closure door. With the locking pin in the extended position, the locking pin can create an interference within the stem housing preventing the pressure alert stem from being installed into the threaded bushing until the locking pin and toggle assembly are fully engaged in the closed position.

A better understanding of these features can be obtained from the description of the drawings and detailed description of the embodiments that follow.

Broadly stated, in some embodiments, a closure device can be provided for a pressure vessel or a pipeline, the closure device comprising: a hub comprising a central opening configured to correspond to an opening in the pressure vessel or pipeline; a door configured to contact the hub and close access to the hub central opening; a hinge assembly operatively coupling the door to the hub; a split annular ring assembly operatively coupled attached to the hub and further comprising opposing ring sections configured to move between an open position to a closed position, the opposing ring sections each comprising an inner channel configured to engage corresponding flange elements disposed on both the door and the hub; an actuating mechanism configured to cause the split annular ring assembly to engage the flange elements thereby fastening the door to the hub; a locking pin configured to inhibit movement of the actuating mechanism when the actuating mechanism is in a locked position, the locking pin configured not to be removed from the actuating mechanism; and a pressure alert assembly operatively coupled to the hub, the pressure alert assembly configured to inhibit movement of the locking pin when the actuating mechanism is in the locked position.

Broadly stated, in some embodiments, the closure device can further comprise a seal disposed between the door and hub.

Broadly stated, in some embodiments, the hinge assembly can further comprise: upper and lower blocks operatively coupled to the door, further comprising a plain pin and a threaded adjustment pin arrangement configured to manipulate a vertical location of the door in relation to the central opening; upper and lower flange plates operatively coupled to the upper and lower blocks on the door, and further comprising a gusset body disposed between the upper and lower flange plates; a hinge shaft; and a hinge adjustment assembly operatively coupling the upper and lower flange plates to the hinge shaft, the hinge adjustment assembly configured to manipulate a position of the door relative to the hub, wherein the hinge assembly can support the door and allow rotation of the door about the hinge shaft.

Broadly stated, in some embodiments, the hinge shaft can comprise an axis that ranges from being substantially vertical to substantially horizontal.

Broadly stated, in some embodiments, the actuating mechanism can further comprise: blocks attached to each of the opposing ring sections, each block comprising a longitudinal through-hole comprising an axis substantially parallel with a plane defined by the split annular ring assembly, wherein the longitudinal through-holes of the blocks substantially align with each other when the opposing ring sections are in the closed position; toggle linkages disposed on anterior and posterior sides of a first of the blocks operatively coupling the first of the blocks to a toggle handle, the toggle handle operatively coupling a second of the blocks to the toggle linkages, the toggle handle configured to move the opposing ring sections between the open and closed positions; and wherein the toggle linkages further comprise second longitudinal through-holes configured to align with the longitudinal through-holes of the blocks when the opposing ring sections are in the closed position.

Broadly stated, in some embodiments, the locking pin can further comprise: a cylindrical pin comprising a diameter substantially corresponding to the longitudinal through-holes of the blocks and the toggle linkages; a locking pin handle shaft comprising first and second ends, the first end operatively coupled to the cylindrical pin, the locking handle shaft substantially perpendicular to the cylindrical pin; and a locking pin handle operatively coupled to the second end.

Broadly stated, in some embodiments, the closure device can further comprise a pressure alert assembly comprising: a stem housing operatively coupled to the hub, the stem housing further enclosing a radial hole disposed through the hub to provide communication with an interior of the pressure vessel or the pipeline; a threaded bushing disposed in the radial hole, the threaded bushing configured to threadably receive an interrupted thread of a pressure alert stem, the threaded bushing further comprising a sealing surface to contact an o-ring seal disposed on the pressure alert stem; and a third longitudinal through-hole disposed through the annular external housing, the third longitudinal through-hole substantially aligned with the longitudinal through-holes of the blocks and with the second longitudinal through-hole when the opposing ring sections are in the closed position.

Broadly stated, in some embodiments, the closure device can further comprise the locking pin disposed in the longitudinal through-holes when the opposing ring sections are in the closed position, the locking pin further configured to be clear of the radial hole when fully inserted into the longitudinal through-holes whereby the pressure alert stem prevents removal of the locking pin therefrom when the pressure alert stem is threaded into the threaded bushing.

Broadly stated, in some embodiments, the interrupted thread can be configured to close off communication to the interior of the pressure vessel or the pipeline when the pressure alert stem is fully threaded and seated in the threaded bushing, and to provide communication to the interior of the pressure vessel or the pipeline when the pressure alert stem is at least partially unthreaded from the threaded bushing.

Broadly stated, in some embodiments, the pressure alert stem can comprise a tee-shaped handle.

Broadly stated, in some embodiments, the pressure alert assembly can further comprise a key lock assembly comprising a retractable locking pin configured to engage a circumferential groove disposed around the pressure alert stem.

Broadly stated, in some embodiments, the hinge assembly can further comprise: upper and lower bearing blocks operatively coupled to the hub; a substantially vertical hinge shaft disposed between and at least partially through each of the upper and lower bearing blocks, the hinge shaft comprising an upper threaded end and a lower threaded end, each of the upper and lower threaded ends comprising upper and lower threaded fasteners, respectively, the threaded fasteners configured to retain the hinge shaft to the upper and lower bearing blocks; a hinge arm comprising a first end operatively coupled to the door, and a second end rotatably disposed about the hinge shaft; one or more stop collars disposed on the hinge shaft, the one or more stop collars configured to lock the second end of the hinge arm in a fixed position on the hinge shaft; and a hinge adjustment assembly configured to manipulate a vertical position of the door relative to the hub, wherein the hinge adjustment assembly can support the door, and wherein the hinge adjustment assembly further comprises the upper and lower threaded fasteners, wherein rotating the upper threaded fastener adjusts the vertical position of the door relative to the upper and lower bearing blocks, and wherein rotating the lower threaded fasteners locks or unlocks the vertical position of the door relative to the upper and lower bearing blocks.

Broadly stated, in some embodiments, the hinge adjustment assembly can be further configured to manipulate a parallel and concentric position of the door relative to the hub, wherein the hinge adjustment assembly can support the door, and wherein the upper and lower bearing blocks can further comprise oppositely arranged screws, wherein rotating the oppositely arranged screws can align the axis of the door relative to the axis of the hub colinearly in the closed position.

Broadly stated, in some embodiments, the closure device can further comprise the pressure vessel, wherein the hub is welded to the pressure vessel.

Broadly stated, in some embodiments, the pressure vessel, wherein the hub is bolted to the pressure vessel.

Broadly stated, in some embodiments, a closure device can be provided for a pressure vessel or a pipeline, the closure device comprising: a hub comprising a central opening configured to correspond to an opening in the pressure vessel or pipeline, the hub further comprising a concentric recess disposed around the central opening; a door configured to contact the hub and close access to the hub central opening, the door further comprising a concentric protrusion, the concentric protrusion configured to seat within the concentric recess when the door is fastened to the hub; a hinge assembly operatively coupling the door to the hub; a split annular ring assembly operatively coupled attached to the hub and further comprising opposing ring sections configured to move between an open position to a closed position, the opposing ring sections each comprising an inner channel configured to engage corresponding flange elements disposed on both the door and the hub; an actuating mechanism configured to cause the split annular ring assembly to engage the flange elements thereby fastening the door to the hub; and an o-ring seal groove disposed concentrically on the door, the seal groove further comprising an o-ring seal disposed therein.

Broadly stated, in some embodiments, the concentric protrusion can be configured to maintain contact with concentric recess when system pressure within the hub urges the door away from the hub when the door is fastened to the hub.

Broadly stated, in some embodiments, the closure device can comprise a locking pin configured to inhibit movement of the actuating mechanism when the actuating mechanism is in a locked position, the locking pin configured not to be removed from the actuating mechanism.

Broadly stated, in some embodiments, the o-ring seal can be comprised of an elastomer material.

Broadly stated, in some embodiments, the seal groove can comprise a diameter less than that of the concentric protrusion.

Broadly stated, in some embodiments, the seal groove can be adjacent to the concentric protrusion.

Broadly stated, in some embodiments, the seal groove can be trapezoidal in cross-section.

Broadly stated, in some embodiments, the closure device can further comprise a passageway providing communication between the seal groove and the central opening when the door is fastened to the hub.

Broadly stated, in some embodiments, the closure device can further comprise at least one bypass groove providing communication between the seal groove and the passageway.

Broadly stated, in some embodiments, the closure device can further comprise at least one bypass groove providing communication between the seal groove and the central opening when the door is fastened to the hub.

DETAILED DESCRIPTION OF EMBODIMENTS

Figure 1:
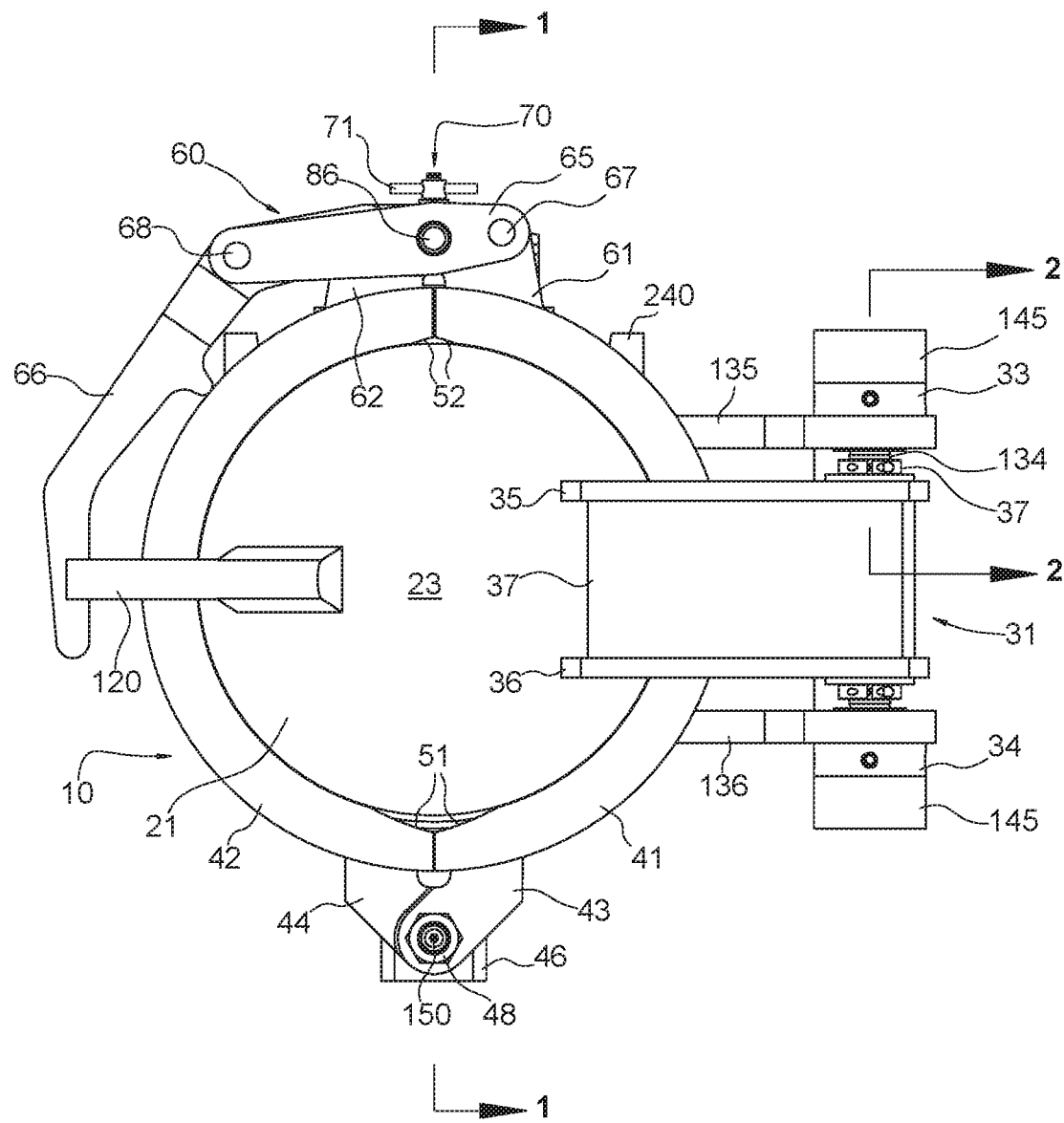
FIG. 1 is a front elevation view depicting one embodiment of a closure assembly in its locked and closed position.
Figure 2:
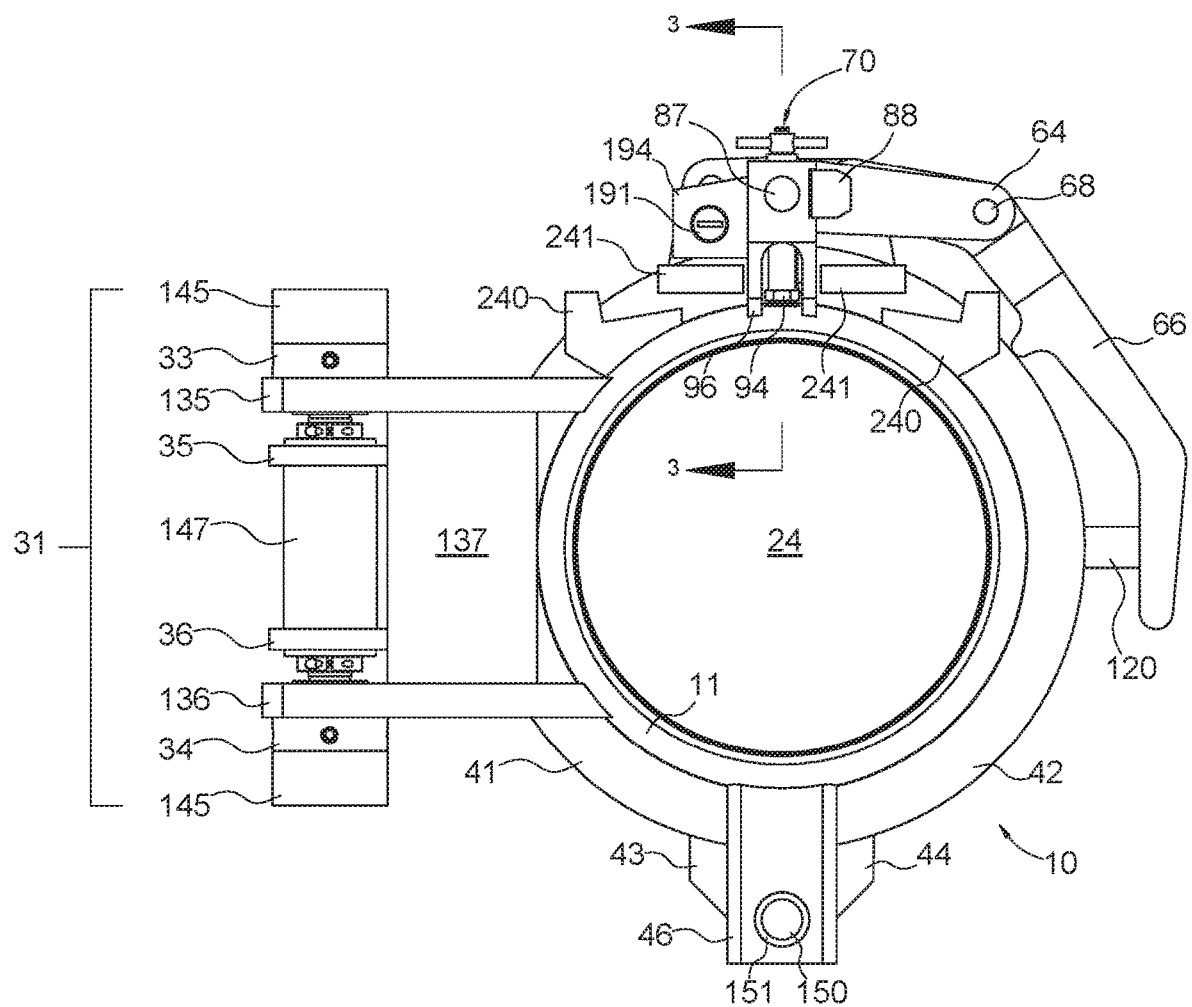
FIG. 2 is a rear elevation view depicting the closure assembly of FIG. 1.
Figure 3:
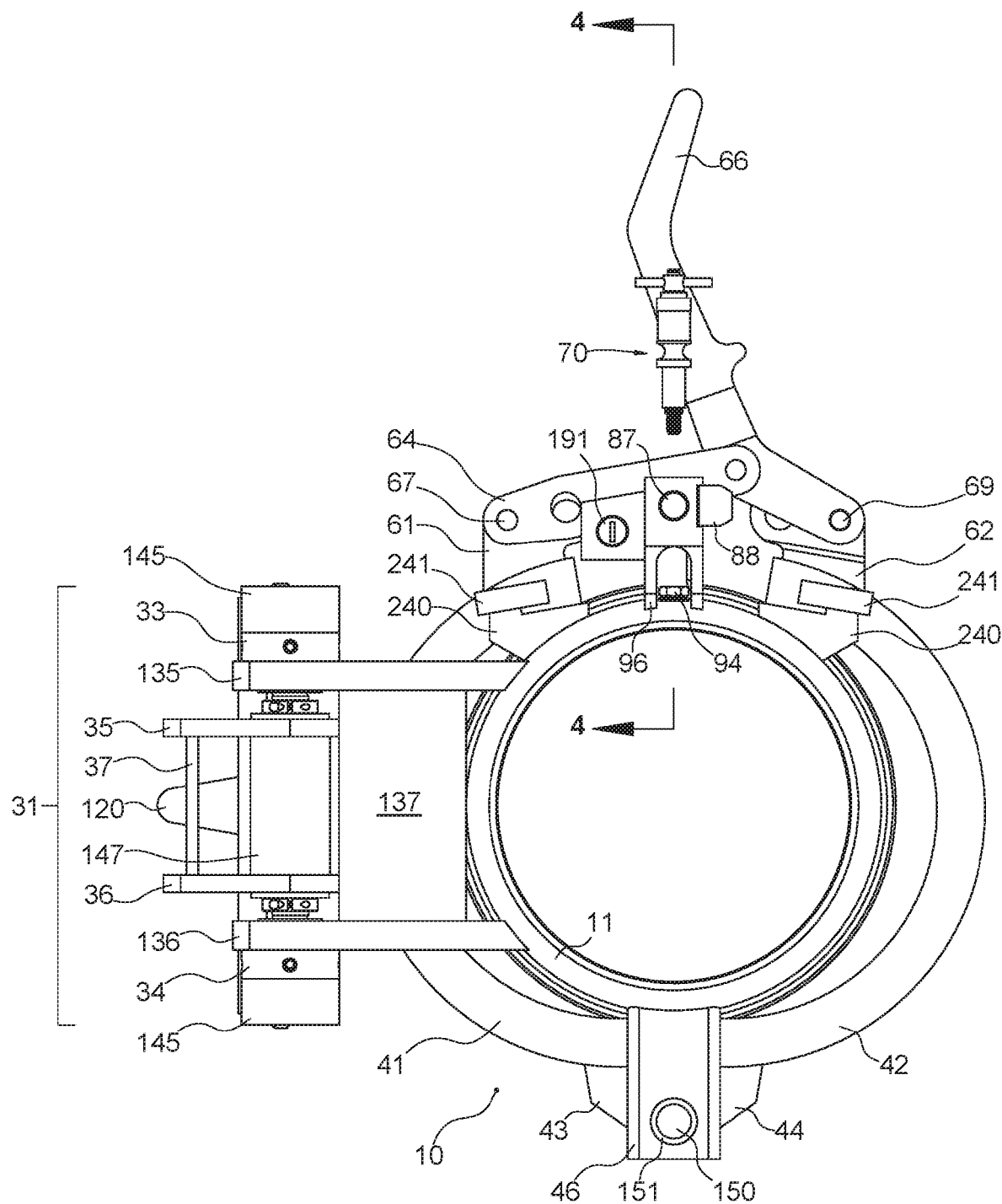
FIG. 3 is a rear elevation view depicting the closure assembly of FIG. 2 in an unlocked and open position.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Referring to FIGS. 1 to 4, an embodiment of a clamp style closure device for a pressure vessel or pipeline is shown. In some embodiments, closure assembly 10 can comprise hub 11, which can be adapted to be attached to pressure vessel opening (not shown) or end of pipe (not shown) by welding with use of an appropriately sized bevel 13 located on the posterior portion of hub 11 matching that of the pressure vessel opening or pipe end. On the anterior end of hub 11, male flange 14 can be provided extending outwardly from the body and circumferentially around the hub edge. Hub 11 can comprise circular bore 12, which can define the central axis of the closure assembly.

In some embodiments, door 21 can be pivotally attached to hub 11 via hinge mechanism 31 for opening and closing closure assembly 10. In some embodiments, door 21 can be circular in configuration with male flange 22 that is matched dimensionally with male flange 14 of hub 11. Anterior end 23 and posterior end 24 of door 21 can be planar and parallel. Door 21 can comprise concentric o-ring seal groove 127 offset from posterior end 24 of door 21 in a face-type configuration that can accept elastomer seal 25 in the form of an o-ring or other configuration that can create a pressure tight seal between hub 11 and door 21. In some embodiments, the plane of sealing surface 28 of hub 11 can be substantially perpendicular to the axis of hub bore 12, and can be further inclined between zero degrees and fifteen degrees (relative to the normal of the axis of hub bore 12) to better accept the seal contained within door 21.

FIGS. 1 to 6 illustrate two halves of split annular ring 41 and 42, for use with closure assembly 10, that can be split equally with a vertical plane passing through the axis of hub 11. Pivot blocks 43 and 44 can be attached to the bottom portion of split annular ring 41 and 42, which can contain through holes 49 and 50, respectively. In some embodiments, hub pivot block 46 can be attached to the bottom of the outer surface of hub 11 with circular hole 153 parallel to the axis of hub 11. In some embodiments, the alignment of holes 49, 50 and 153 can be such that pivot pin 150 can pass axially through all holes and allow the two halves of split annular ring 41 and 42 to rotate about the axis of pivot pin 150. Pivot pin 150 can comprise external threads for installation of nut 48 to secure the split annular ring assembly in place. In some embodiments, spacer bushing 151 can be installed between hub pivot block 46 and pivot pin 150 to maintain alignment of split annular ring 41 and 42, mating hub flange 14 and door flange 22.

To maintain planar movement of split annular ring 41 and 42 about hub contact face 28, guide bar 240 can attach to the outer periphery of hub 11 and can be captured within a slot of guide bar 241. As split annular ring 41 and 42 advances to the open position, surfaces 242 and 243, as shown in FIGS. 11 to 14, can come into contact and limit the movement of split annular ring 41 and 42 about pivot pin 150. In some embodiments, one set of guide bars 240, 241 can be mirrored about hub 11 vertical plane for each split annular ring 41 and 42.

Figure 4:
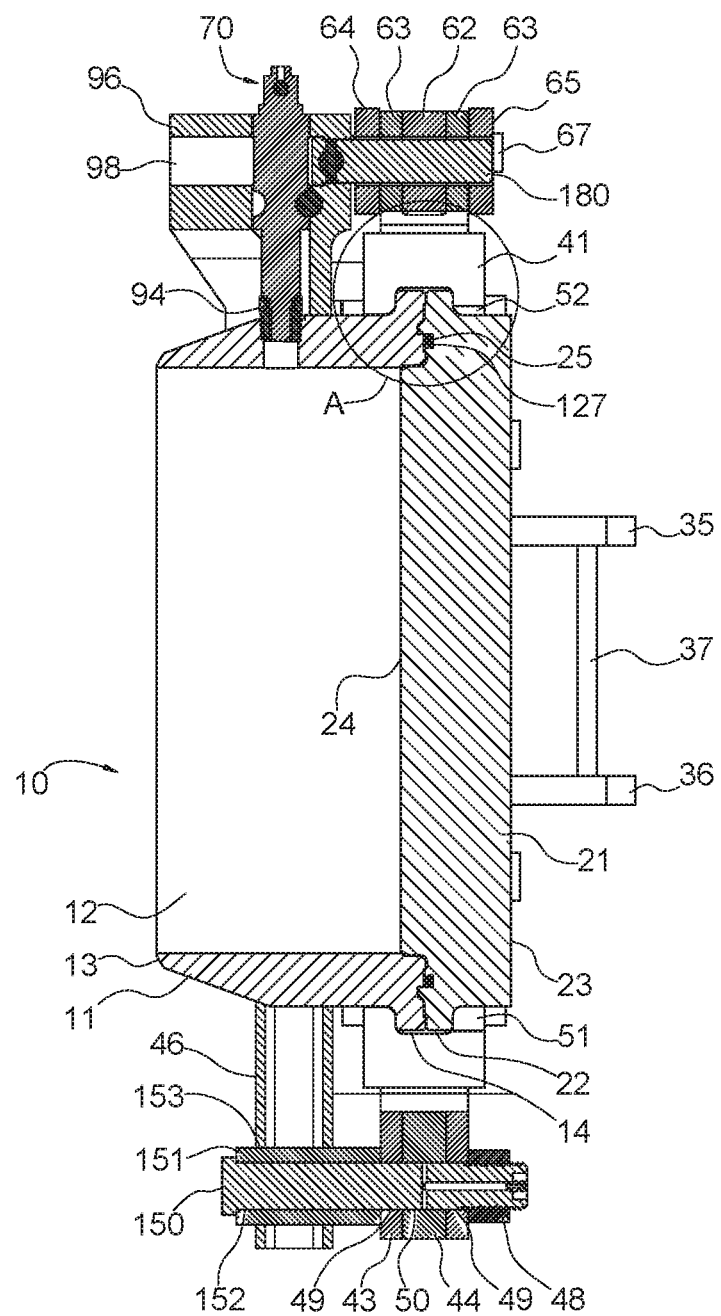
FIG. 4 is a side elevation cross-section view depicting the closure assembly of FIG. 1 along section lines 1-1.
Figure 5:
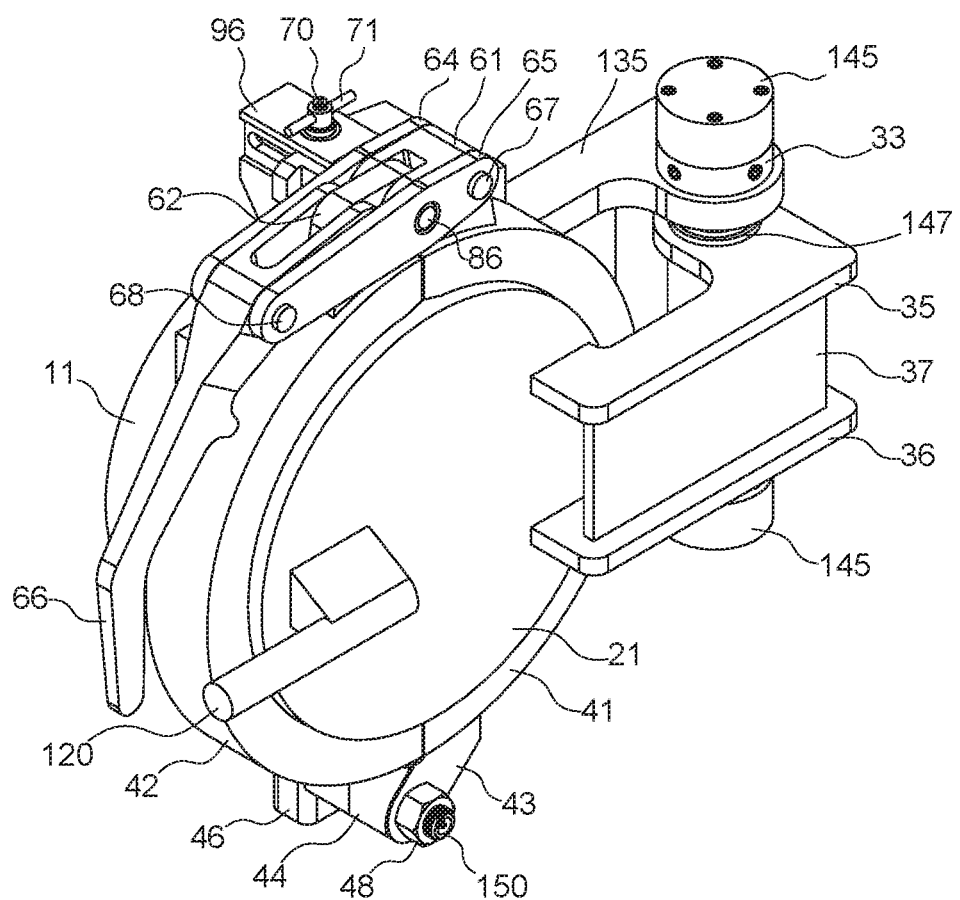
FIG. 5 is a front perspective view depicting the closure assembly of FIG. 1 in its locked and closed position.
Figure 6:
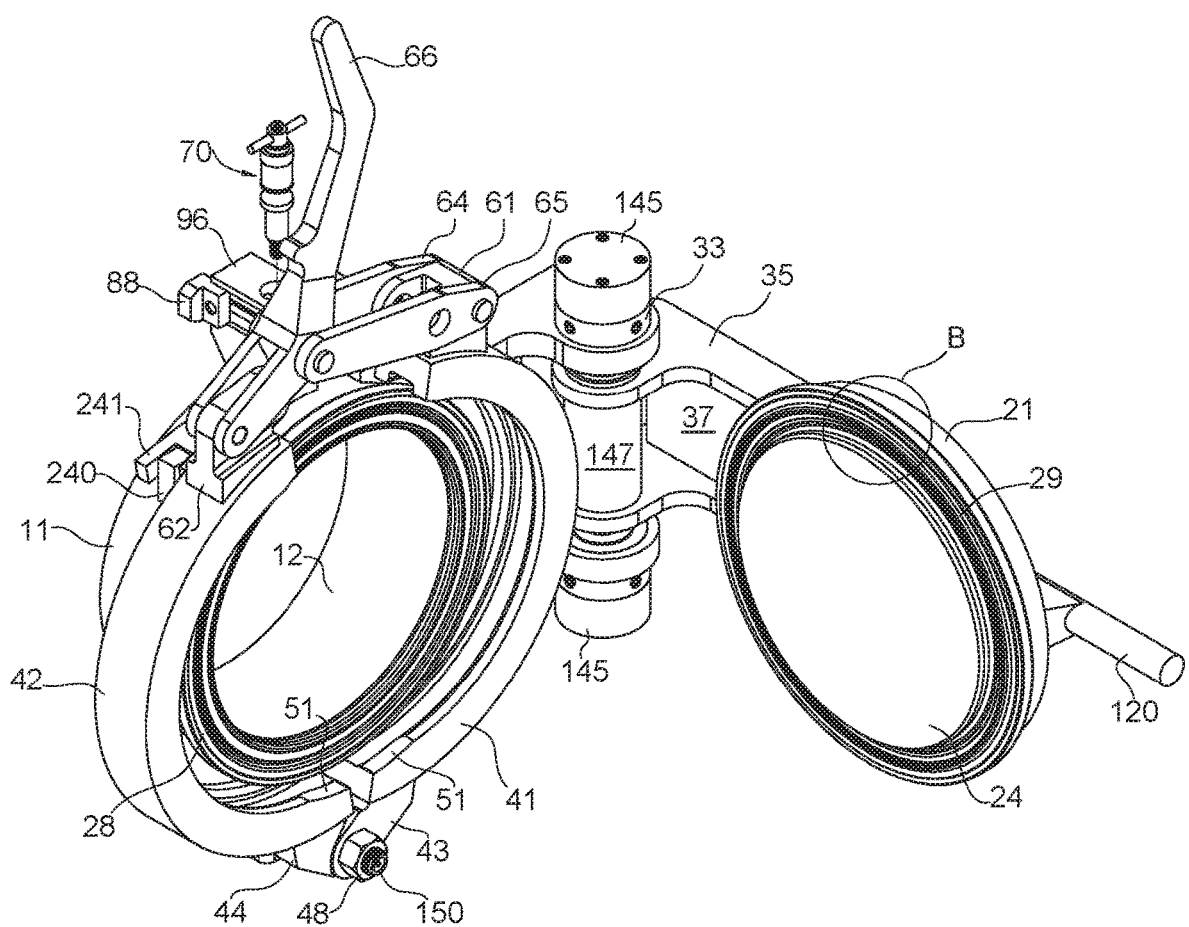
FIG. 6 is a front perspective view depicting the closure assembly of FIG. 5 in an unlocked and open position.
Figure 21:
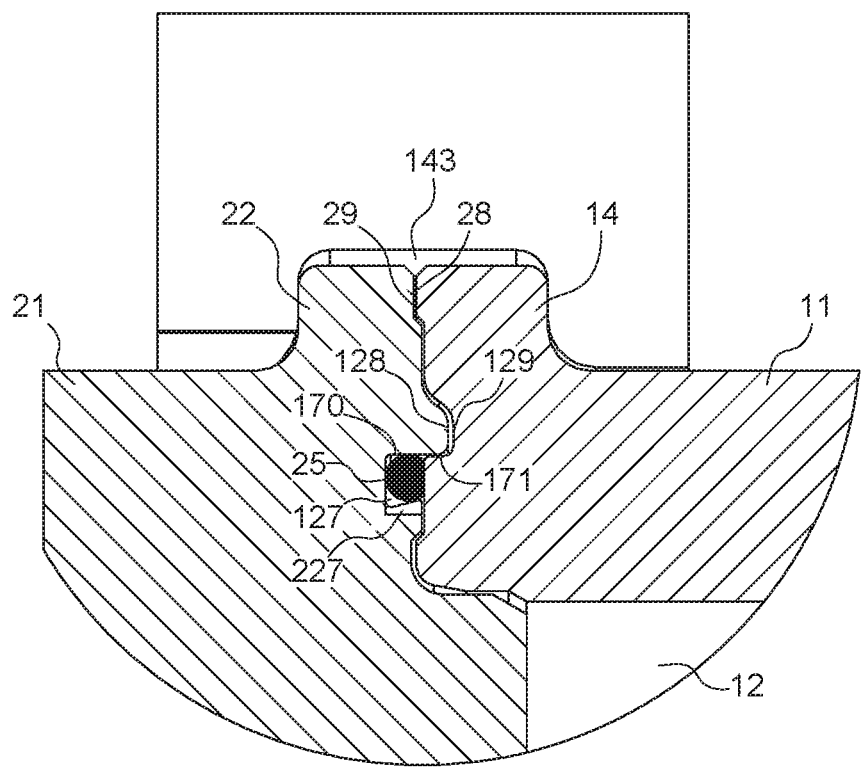
FIG. 21 is a close-up cross-section view depicting Detail A of FIG. 4.

Referring to FIGS. 4 and 21, in some embodiments, split annular ring 41 and 42 can act as a means for drawing hub male flange 14 and door male flange 22 together to facilitate contact between hub contact face 28 and door contact face 29 when rotated into the closed position about pivot pin 150. Split annular ring 41 and 42 can comprise inner channel 143 concentric to hub bore 12 that is wide enough to accept both the axial width of hub male flange 14 and door male flange 22. In some embodiments, the sides of inner channel 143, and the corresponding contact sides of hub male flange 14 and door male flange 22 can be parallel. The included contact angle between opposing sides of inner channel 143 can vary from zero degrees to 10 degrees. In some embodiments, split annular ring 41 and 42 can comprise clearance arcs 51 and 52, which can further comprise of circular sectors of a diameter exceeding the outer diameter of door male flange 22 as they are projected on split annular ring 41 and 42 in the open position. In some embodiments, arcs 51 and 52 can extend through the anterior outer surface of split annular ring 41 and 42 or through both the anterior and posterior outer surface of split annular ring 41 and 42.

Referring to FIGS. 1 to 8, in some embodiments of closure assembly 10, hinge assembly 31 can be provided as a means to support the weight of door 21 during opening and closing operations and, additionally, to allow door 21 to be pivoted about the vertical axis of hinge shaft 134 to facilitate access to hub bore 12 by employing use of door handle 120. Hinge assembly 31 can comprise upper and lower mounting plates 135 and 136, respectively, operatively coupled to hub 11, wherein mounting plates 135 and 136 can be coupled to hub 11 with fasteners or can be integral to the structure of hub 11. Mounting plates 135 and 136 can be affixed by cross member 137 to maintain parallelism between plates 135 and 136 and to maintain parallelism between cross member 137 and hub contact face 28. Mounting plates 135 and 136 can comprise two opposing and axial mounting holes that can accept upper and lower bearing blocks 33 and 34 that can be aligned parallel with the vertical axis of hub 11. In some embodiments, hinge assembly 31 can comprise upper and lower mounting plates 35 and 36, respectively, operatively coupled to door 21 and can be either be coupled to door 21 with fasteners or be integral to the structure of door 21. Mounting plates 35 and 36 can be affixed by cross member 37 to maintain parallelism between plates 35 and 36 and to maintain parallelism between cross member 37 and door contact face 29. Mounting plates 35 and 36 can comprise two opposing and axial mounting holes that can accept hinge bearing housing 147 and can pivot about the axis of hinge shaft 134. Hinge shaft 134 can be supported axially within the hinge bearing housing 147 by means of upper and lower shaft collars 37 and 237 (lower shaft collar 137 not shown) and radially by upper and lower bearings 39 and 239 (lower bearing 239 not shown). Upper and lower bearings 39 and 239 (lower bearing 239 not shown) can be sealed by means of upper and lower seal ring 38 and 238 (lower seal ring 238 not shown). Each end of hinge shaft 134 can be threaded and can have upper and lower nut 135 and 235 (lower nut 235 not shown) threaded thereupon. Adjustment of door 21 positioning within the vertical plane can be achieved by alternatively loosening upper and lower nuts 135 and 235 (lower nut 235 not shown) on both ends of hinge shaft 134.

Figure 7:
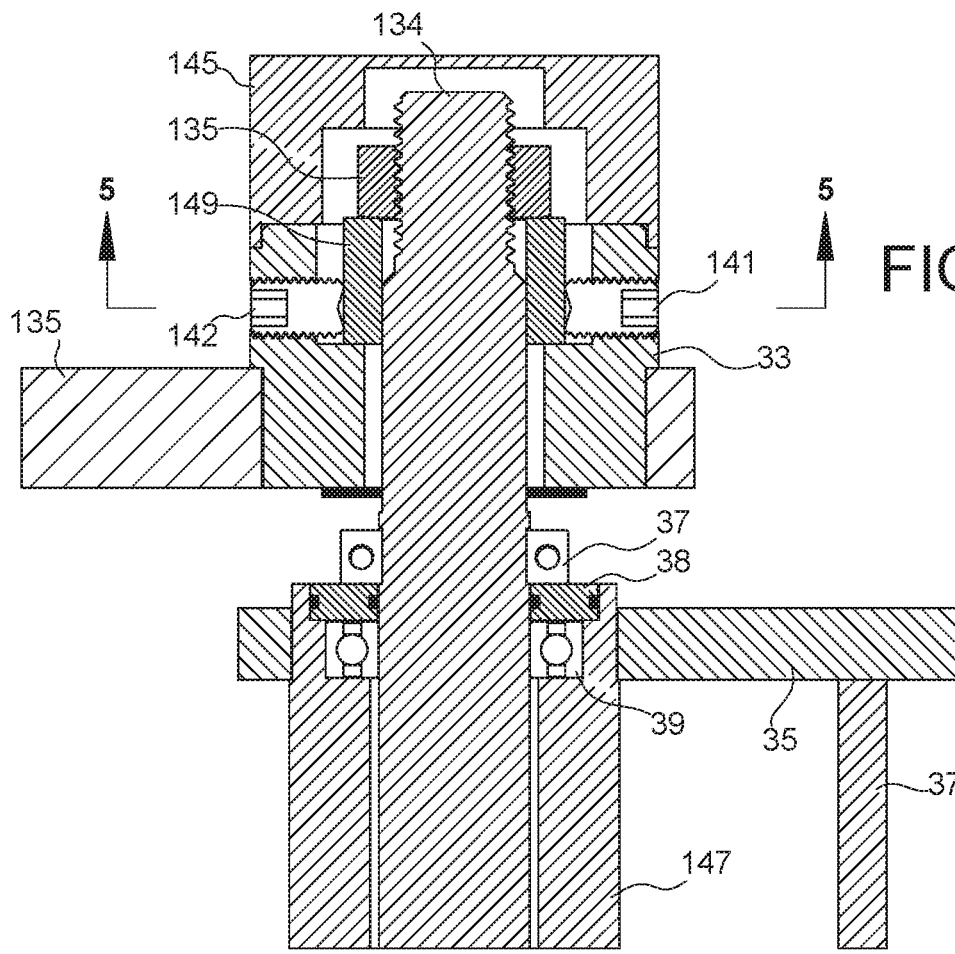
FIG. 7 is a side elevation cross-section view depicting a hinge of the closure assembly of FIG. 1 along section lines 2-2.
Figure 8:
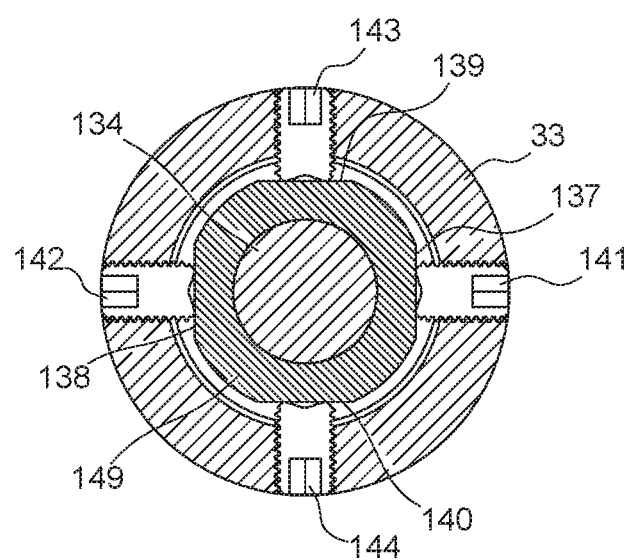
FIG. 8 is a top plan cross-section view depicting the hinge of FIG. 7 along section lines 5-5.
Figure 9:
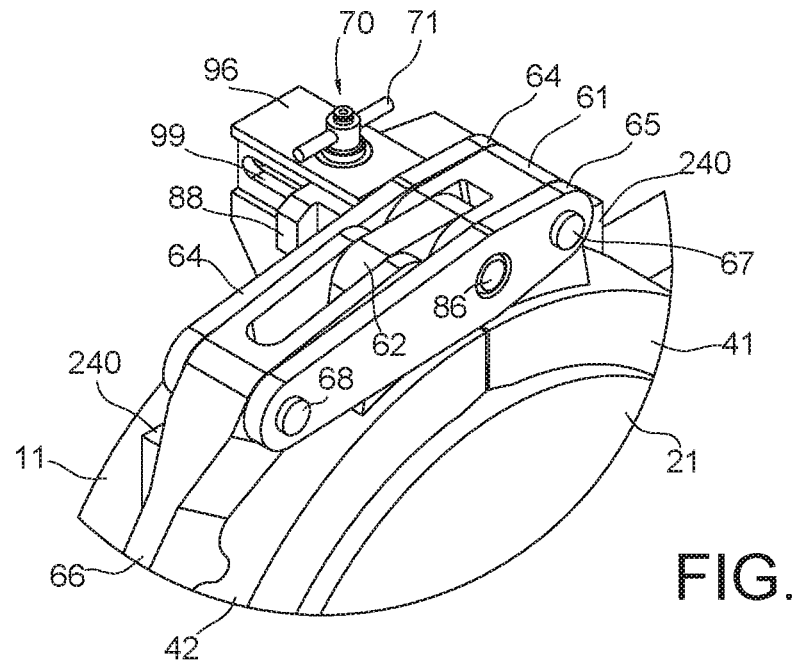
FIG. 9 is a close-up perspective view depicting the toggle mechanism/locking pin arrangement of the closure assembly of FIG. 5 in a closed and locked position, as viewed from the anterior end.
Figure 15:
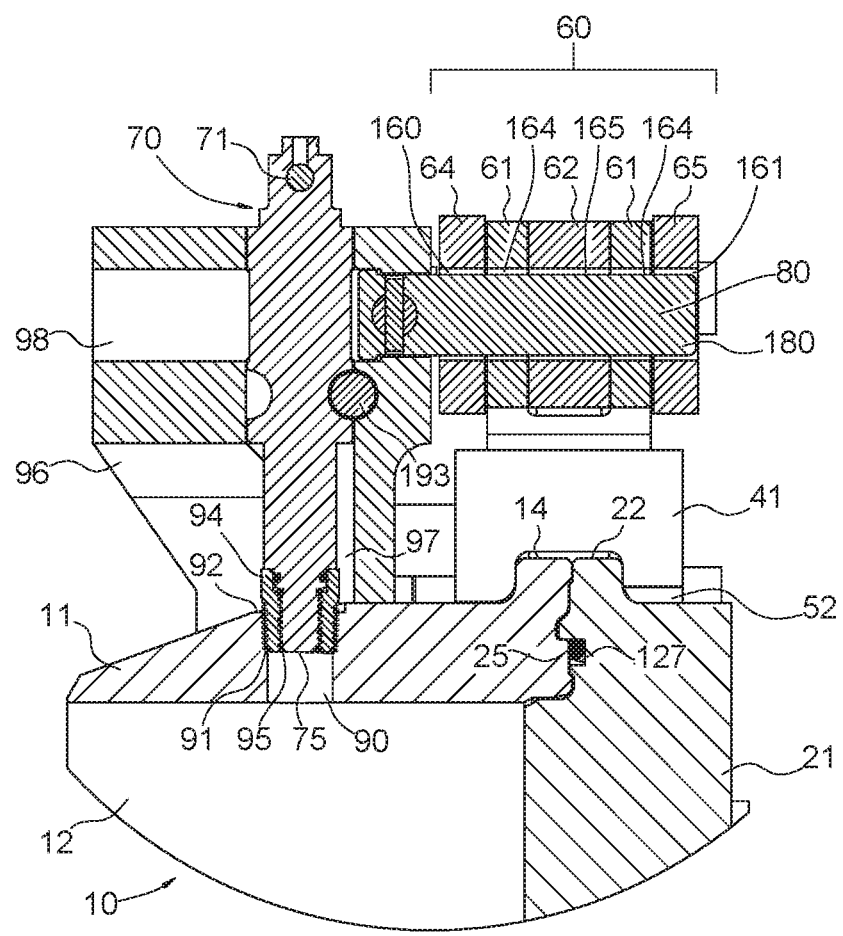
FIG. 15 is a close-up elevation cross-section view depicting the closure assembly of FIG. 2 along section lines 3-3.

With reference to FIGS. 7, 8 and 15, upper and lower bearing blocks 33 and 34 (lower bearing block 34 not shown) can be operatively coupled to upper and lower mounting plates 135 and 136, as described above. Hinge shaft 134 can be disposed inside adjustment collar 149. The outside of collar 149 can comprise of oppositely arranged planar edges 137, 138, 139 and 140. In some embodiments, upper and lower bearing blocks 33 and 34 can comprise oppositely arranged screws 141, 142, 143 and 144 located with threaded holes arranged radially with hinge shaft 134 axis that can contact edges 137, 138, 139 and 140. By loosening and alternately tightening opposing screws 141, 142, 143 and 144, axis hinge shaft 134 and, by extension, door contact face 29, can be tilted in minute increments to achieve parallelism between hub contact face 28 and door contact face 29, and concentricity between the circular outer edges of hub male flange 14 and door male flange 22. In some embodiments, circular dished cap 145 can be installed over upper and lower bearing blocks 33 and 34 and be retained by a plurality of screws.

Figure 10:
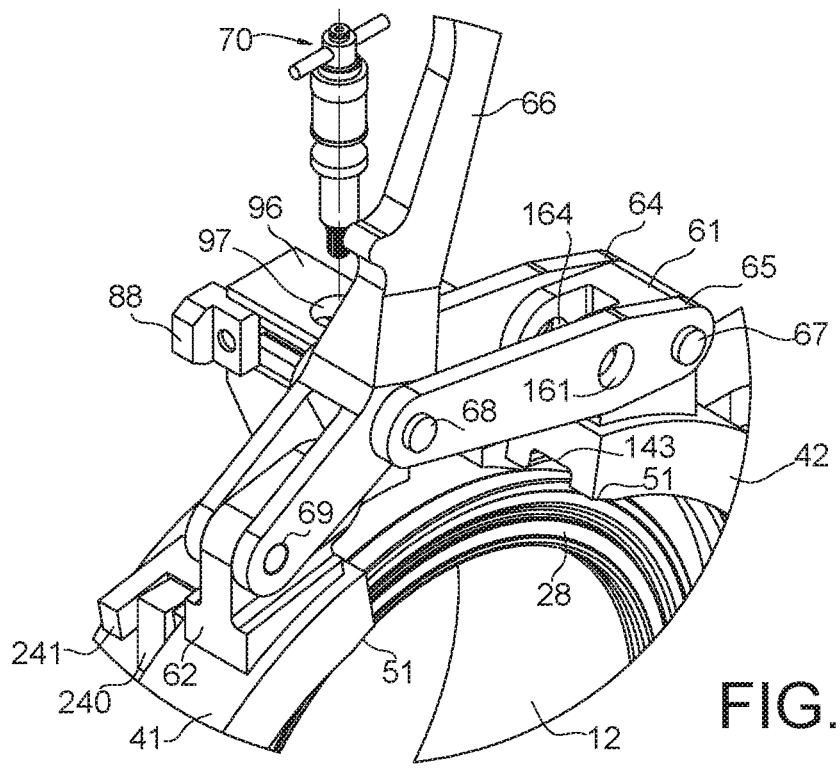
FIG. 10 is a close-up perspective view depicting the toggle mechanism/locking pin arrangement of the closure assembly of FIG. 6 in an open and unlocked position, as viewed from the anterior end.
Figure 11:
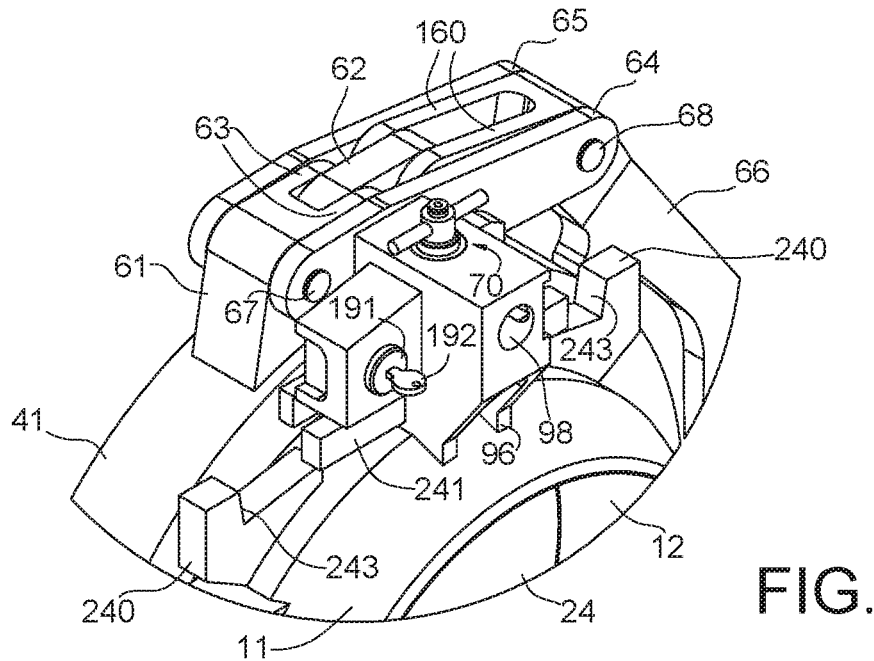
FIG. 11 is a close-up perspective view depicting the toggle mechanism/locking pin arrangement of the closure assembly of FIG. 9 in a closed and locked position, as viewed from the posterior end.
Figure 12:
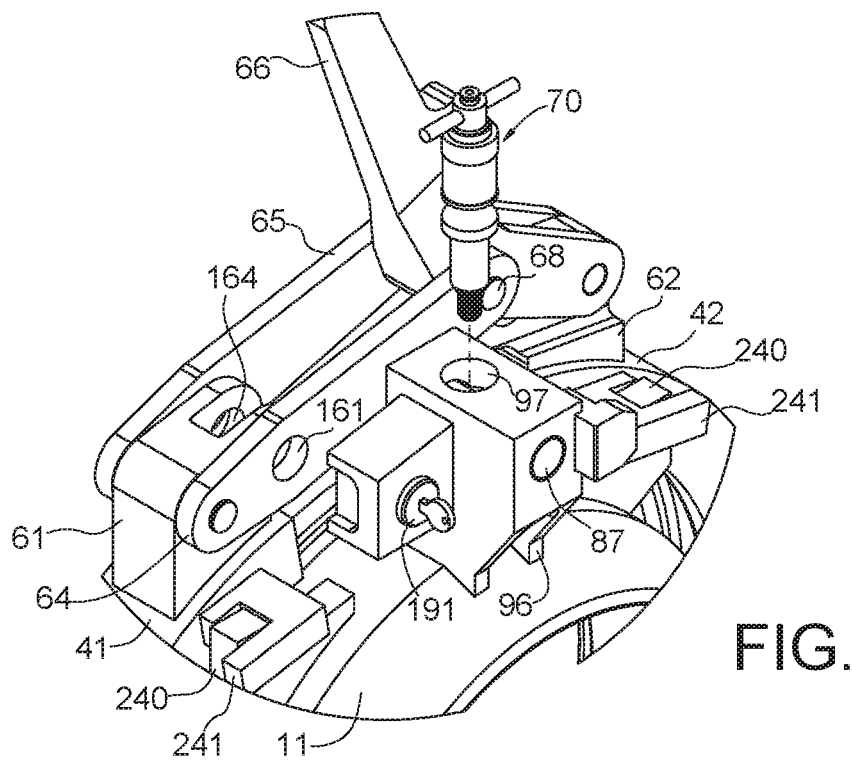
FIG. 12 is a close-up perspective view depicting the toggle mechanism/locking pin arrangement of the closure assembly of FIG. 10 in an open and unlocked position, as viewed from the posterior end.

FIGS. 9 to 14 illustrate, in some embodiments for use with closure assembly 10, an over-center toggle mechanism attached to the top of split annular ring 41 and 42, which can function to move split annular ring 41 and 42 into its locked position, and to expand split annular ring 41 and 42 into the unlocked position through rotation about pivot pin 150. Toggle block 61 can be mounted radially on one half of split annular ring 41 on the end opposite pivot block 43, as shown in FIG. 1. Likewise, toggle block 62 can be mounted radially on one half of the annular ring 42 on the end opposite pivot block 44. In some embodiments, toggle block 61 can comprise two tines 63 that can accept the body of toggle block 62 during the locking operation, as shown in FIGS. 4, 11 and 15. Toggle blocks 61, 62 can further comprise through-holes 164 and 165, respectively, that can align axially when split annular ring 41 and 42 are in the closed and locked position, and parallel with the axis of hub 11. In some embodiments, toggle handle 66 can comprise tines 160 that can straddle toggle block 62. Toggle linkages 64, 65 can be installed on either side of toggle blocks 61, 62. In some embodiments, toggle pin 67 can be inserted through holes provided by toggle linkage 64, 65 and toggle block 61. Toggle pin 68 can be inserted through holes provided by toggle linkage 64, 65 and toggle handle 66, as shown in FIGS. 11 and 12. Toggle pin 69 can be inserted through holes provided by toggle block 62 and toggle handle 66, as shown in FIG. 10. During the action of pivoting toggle handle 66 about the axis of toggle pin 69, toggle linkages 64, 65 can, subsequently, pivot about toggle pins 67, 68 forcing the split annular ring 41 and 42 to pivot about pivot pin 150. Toggle linkages 64, 65 can comprise through-hole 160 and 161, respectively, that can align axially with holes 164 and 165 on toggle blocks 61 and 62, respectively, when split annular ring 41 and 42 are in the closed and locked position and is parallel with the axis of hub 11.

Figure 17:
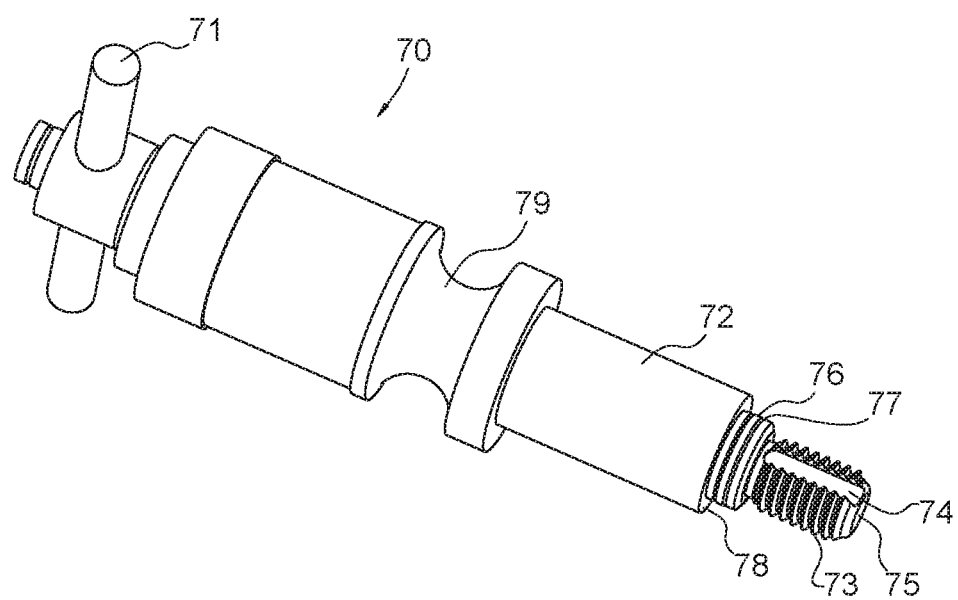
FIG. 17 is a perspective view depicting the pressure alert stem of the closure assembly of FIG. 16.

Referring to FIG. 17, in some embodiments, closure assembly 10 can comprise pressure alert stem 70, further comprising of tee-shaped head 71 configured to turned by hand wherein pressure alert stem 70 can be tightened hand-tight and not over-torqued with a wrench. Pressure alert stem 70 can further comprise cylindrical extension 72 and threaded body 73 on the end opposite tee-shaped head 71. Cylindrical extension 72 can further comprise circumferential groove 79 disposed therearound. In some embodiments, threaded body 73 can comprise longitudinal groove 74 parallel with pressure alert stem 70 axis. Longitudinal groove 74 can extend from threaded body end 75 through entire longitudinal length of threaded body 73 at a depth equal to or greater than the root diameter of the thread. An appropriately sized o-ring 76 can be passed over threaded body 73 and installed into o-ring groove 77 adjacent end surface 78.

Figure 18:
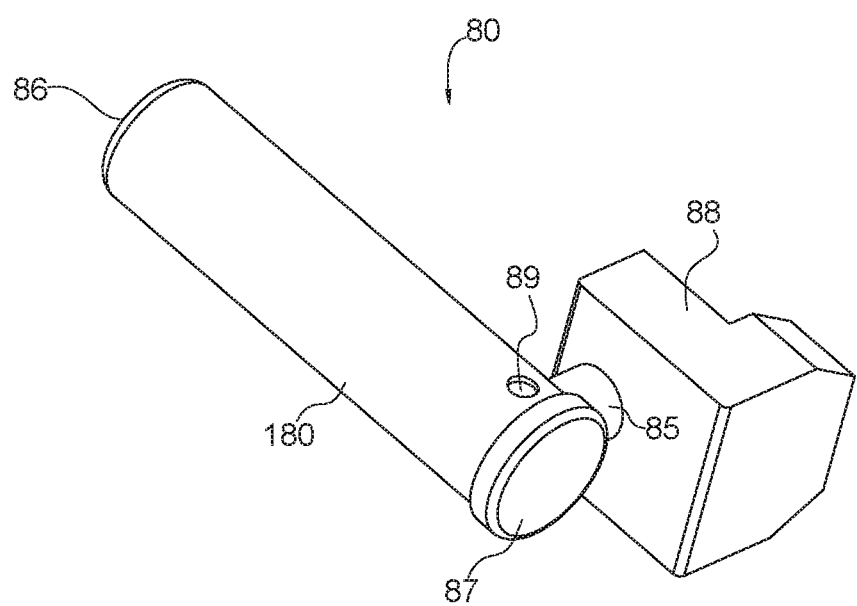
FIG. 18 is a perspective view depicting the locking pin of the closure assembly of FIGS. 13 to 16.

Referring to FIG. 18, one embodiment of locking pin 80 is shown. In some embodiments, locking pin 80 can comprise of cylindrical pin 180 having pin end 86 disposed at one end therefor and end profile 87 disposed at an opposing end thereof. Locking pin 80 can further comprise locking pin handle 88 operatively coupled to cylindrical pin 180 via locking pin handle shaft 85 disposed therebetween, wherein locking pin handle shaft 85 can be substantially perpendicular to cylindrical pin 180. In some embodiments, locking pin handle shaft 85 can comprise first and second ends wherein the first end can be operatively coupled to cylindrical pin 180 with fastener 89, which can comprise a set screw, a dowel pin, a spring pin or any other fastening means well known to those skilled in the art, and wherein locking pin handle 88 can be operatively coupled to second end of locking pin handle shaft 85.

Figure 13:
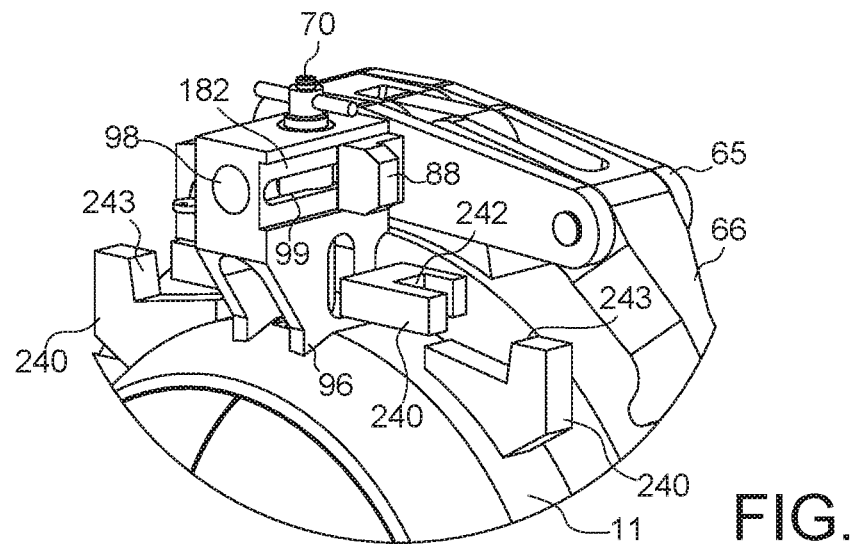
FIG. 13 is a close-up perspective view of the toggle mechanism/locking pin arrangement of the closure assembly of FIG. 11 in a closed and locked position, as viewed from the posterior end.
Figure 14:
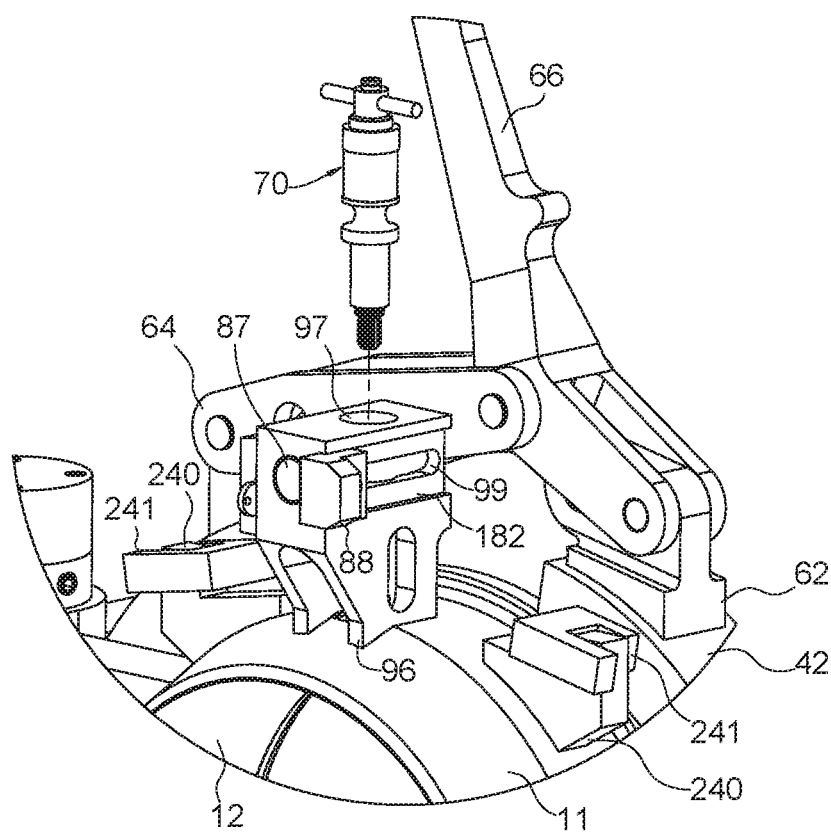
FIG. 14 is a perspective view of the toggle mechanism/locking pin arrangement of the closure assembly of FIG. 12 in an open and unlocked position, as viewed from the posterior end.
Figure 16:
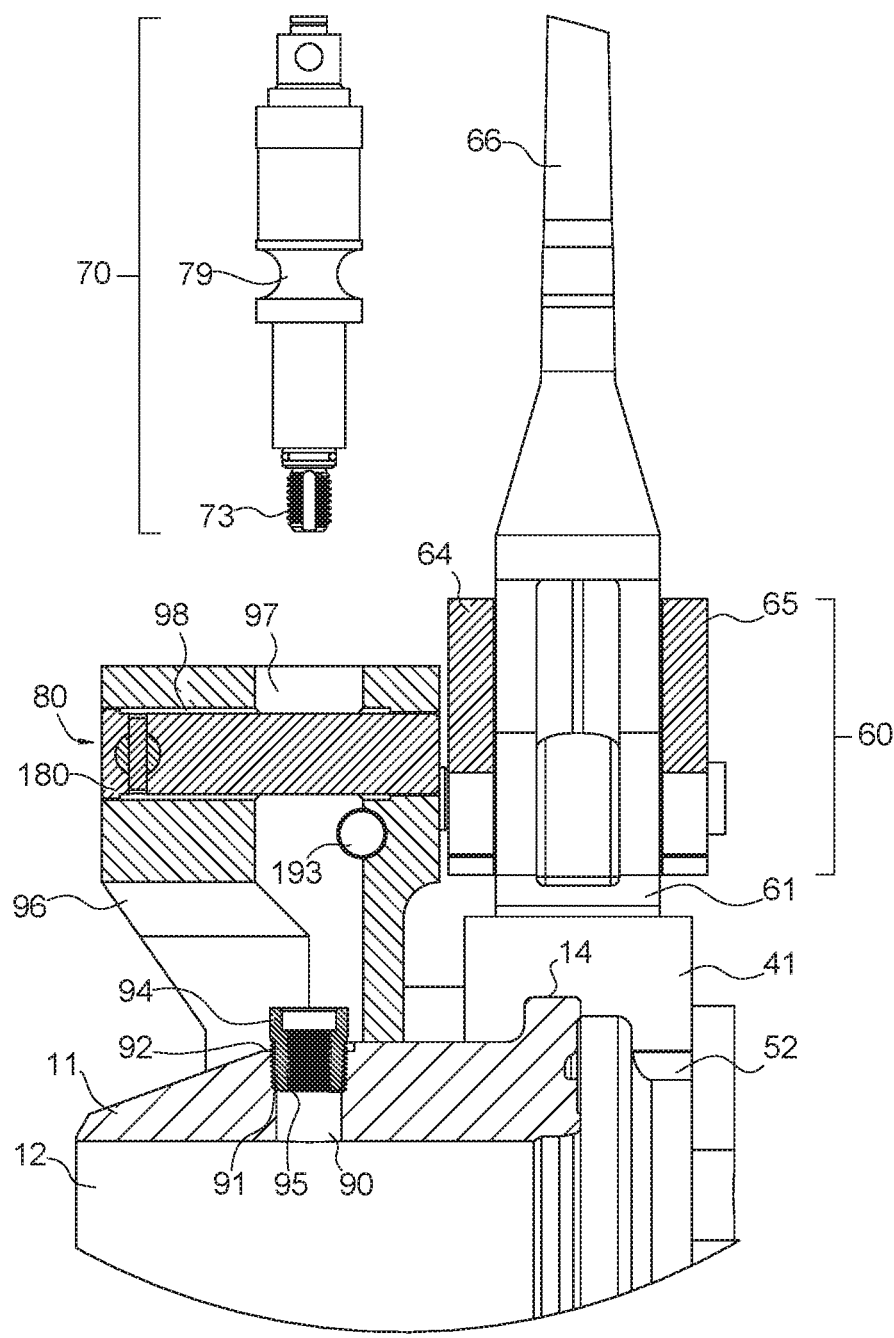
FIG. 16 is a close-up elevation cross-section view depicting the closure assembly of FIG. 15 in an open and unlocked position.

Referring to FIGS. 15 and 16, in some embodiments, radial hole 90 can be provided in hub 11 having straight or taper thread 91 located towards outer surface 92 of hub 11. Threaded bushing 94, comprising an external straight or tapered thread matching straight or tapered thread 91, and straight internal thread 95 matching the size of threaded body 73 of pressure alert stem 70, can be installed into radial hole 90. In some embodiments, stem housing 96 can be attached radially to outer surface 92 of hub 11 with radial hole 97 concentric to radial hole 90. In some embodiments, stem housing 96 can comprise longitudinal hole 98 relative to radial hole 97 that can further comprise a profile identical to end profile 87 of lock pin 80 as shown in FIG. 18, and wherein longitudinal hole 98 can be parallel to the axis of hub 11. In some embodiments, slot 99 (as shown in FIGS. 13 and 14) can be parallel to longitudinal hole 98 and perpendicular to radial hole 97 and can further extend into radial hole 97 and be sized to accept locking pin handle shaft 85. Locking pin 80 can be installed in stem housing 96 by cylindrical pin being disposed in longitudinal hole 98 wherein locking pin handle shaft 85 can disposed through slot 99 of sidewall 182 of stem housing 96 and attached to cylindrical pin 180 with fastener 89. Locking pin handle shaft 85 can then be installed onto locking pin handle shaft 85 on an exterior side of sidewall 182. In some embodiments, the diameter of locking pin handle shaft 85 and the height of slot 99 can each be smaller than or equal to the diameter of cylindrical pin 180. In some embodiments, the dimensions of locking pin handle 88 can be larger than the height of slot 99. In so doing, cylindrical pin 180 can translate longitudinally within longitudinal hole 98 as locking pin handle shaft 85 likewise translates along slot 99 of stem housing 96, such that movement of locking pin handle shaft 85 is constrained within slot 99. In this manner, locking pin 80 can move laterally from a locked position, as shown in FIG. 15, to an unlocked position, as shown in FIG. 16, wherein end profile 87 of locking pin 80 does not extend out of longitudinal hole 98 of stem housing 96. This overcomes the problem of requiring additional clearance to remove locking pin 80 from the assembly altogether, which was required in prior art solutions as described above, as well as keeping locking pin 80 constrained to stem assembly 96 thereby removing the risk of damaging or misplacing locking pin 80 altogether.

Referring to FIGS. 15 and 16, the safety features and characteristics of closure assembly 10 are shown. With toggle mechanism 60, split annular ring 41 and 42 and door 21 in the closed position, toggle linkage holes 160 and 161, toggle block holes 164 and 165, and stem housing longitudinal hole 98 can align along a common axis and, thus, allow locking pin 80 to be installed until locking pin handle shaft 85 contacts the end of slot 99 (as shown in FIGS. 13 and 14) of pressure alert stem housing 96, thus inhibiting the movement and function of toggle mechanism 60 and split annular ring 41 and 42. Pressure alert stem 70 can be inserted through radial hole 97 up to threaded bushing 94. Pressure alert stem 70 can then be threaded into threaded bushing 94 until stem end surface 78 contacts threaded bushing 94 and pressure alert stem o-ring 76 is confined within threaded bushing 94 effecting a seal.

Figure 19:
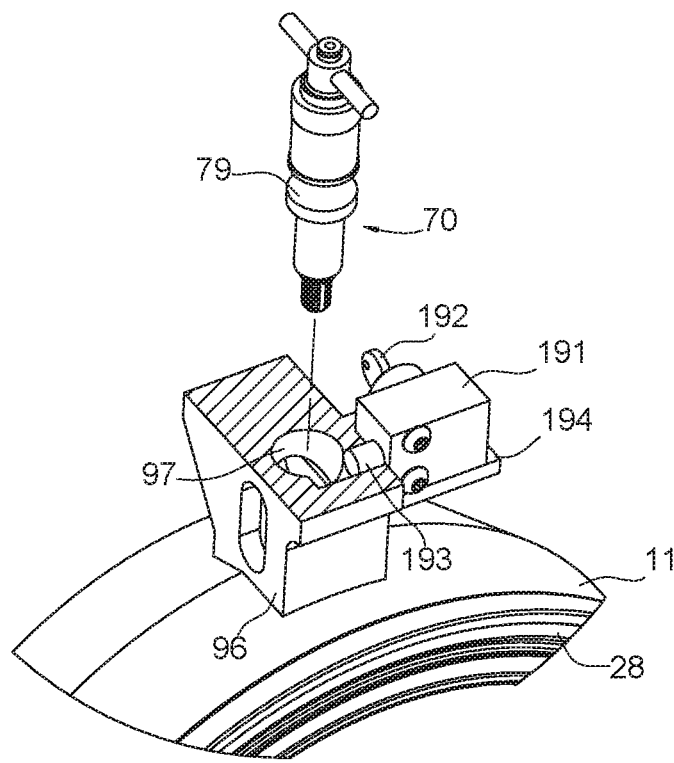
FIG. 19 is a perspective, partial cutaway view depicting the closure assembly of FIG. 16 with the pressure alert stem being inserted therein.
Figure 20:
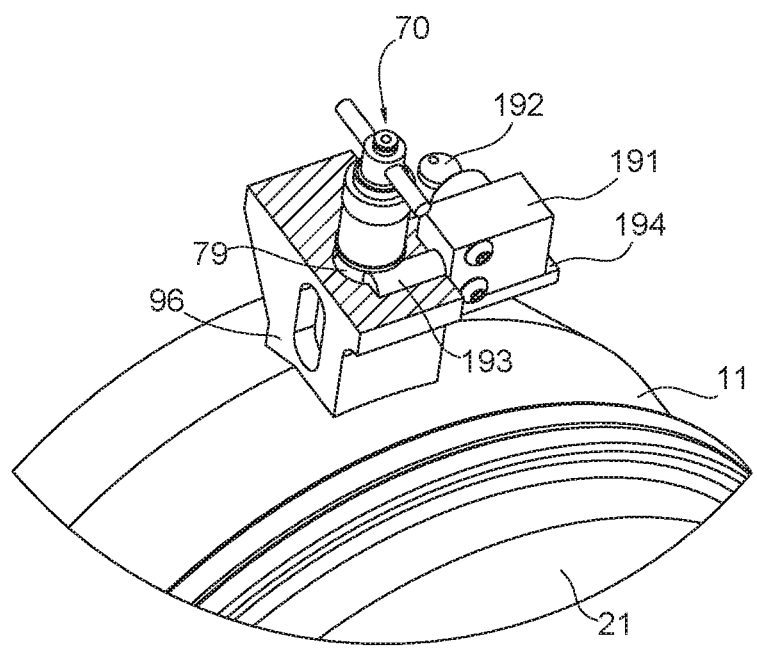
FIG. 20 is a perspective, partial cutaway view depicting the closure assembly of FIG. 15 with the pressure alert stem inserted and locked thereto.

Referring to FIG. 19, pressure alert stem 70 is shown being inserted into radial hole 97. Disposed in recess 194 pressure alert stem housing 96 can be lock mechanism 191. As shown in FIG. 19, when key 192 is turned to the "unlock"

position as shown, locking pin 193 retracts into lock mechanism 191, as shown. Referring to FIG. 20, pressure alert stem 70 is shown fully inserted in radial hole 97, wherein key 192 can be turned to the "lock" position (as shown) thereby causing locking pin 193 to extend from lock mechanism 191 into groove 79 of pressure alert stem 70 thereby preventing pressure alert stem 70 from being removed from radial hole 97 thus locking closure assembly 10.

In some embodiments, closure assembly 10 can comprise an alternate sealing configuration, as shown in FIGS. 21, 22, 25 and 26. In some embodiments, hub 11 can comprise concentric recess 129 disposed therearound about hub bore 12, wherein recess 129 can be configured to receive concentric protrusion 128 disposed adjacent groove 127 disposed on door 21, similar to a tongue and groove configuration. In some embodiments, groove 127 can comprise a rectangular or right trapezoidal cross-section configuration. Protrusion 128 and recess 129 can comprise complimentary profiles wherein protrusion 128 is disposed in recess 129 when door 21 is closed and joined together with hub 11 by split annular rings 41 and 42, and wherein protrusion edge 170 overlaps with ledge 171 of recess 129. As gas or fluid pressures increase within hub bore 12 within closure assembly 10, the pressure can urge door 21 away from hub 11. As this occurs, protrusion 128 can partially retract from recess 129 but still maintain retention of o-ring seal 25 within groove 127. Without this configuration of protrusion 128 and recess 129, excessive pressure within closure assembly 10 could otherwise cause o-ring seal 25 to expand outward from groove 127 into the interstitial gap between door 21 and hub 11, thus resulting in a breach in the seal therebetween.

With the embodiments in the foregoing fully engaged, closure actuation is prevented until it can be verified no differential pressure exists within hub bore 12. To accomplish this, pressure alert stem 70 can be rotated counter-clockwise until o-ring seal 76 backs out of threaded bushing 94. If differential pressure exists within hub bore 12, the media (liquid and/or gas) present within hub 11 would expel through longitudinal groove 74, alerting the operator of a differential pressure condition within hub 11. With o-ring seal 76 broken and media venting, threaded body 73 would still be sufficiently engaged to prevent pressure alert stem 70 from being expelled out of radial hole 97, thus preventing harm to the operator. When alerted to a differential pressure situation within hub 11, the operator can then rotate pressure alert stem 70 clockwise to re-seal o-ring 76 within threaded bushing 94 and follow procedures to reduce the differential pressure to zero.

If, during the counter-clockwise rotation of pressure alert stem 70 and breaking of o-ring seal 76, that no differential pressure is observed, pressure alert stem 70 may be fully extracted from threaded bushing 94 and finally out of stem housing 96. Only then can locking pin 80 be disengaged by sliding the pin longitudinally through toggle linkage holes 160 and 161, toggle block holes 164 and 165, and stem housing longitudinal hole 98 until locking pin handle shaft 85 contacts the posterior end of slot 99 within stem housing 96. Toggle mechanism 60 can then be actuated causing split annular ring 41 and 42 to rotate around pivot pin 150 and allow door 21 to rotate about hinge shaft 134 axis.

In some embodiments, locking pin 80 can provide an additional advantage over the prior art in that it can incorporate an extra layer of redundancy to the holding characteristics of toggle mechanism 60. If, in the event that a failure should occur in one or more features of toggle mechanism 60, locking pin 80 would remain engaged within toggle blocks 61 and 62, thereby reducing the possibility of split annular ring 41 and 42 movement and door 21 opening while hub 11 contains differential pressure.

Referring to FIGS. 21, 22, 25 and 26, in some embodiments, door 21 can comprise one or more pressure bypass grooves 227, each comprising a circular indentation on the inside surface of seal groove 127 on door 21, which can act as a means for pressure within hub bore 12 to enter the void space between groove 127 and o-ring 25 thereby pushing o-ring 25 against hub 11. As gas or fluid pressures increase within hub bore 12 within closure assembly 10, the pressure can urge door 21 away from hub 11. Pressure entering pressure bypass groove 227 can allow the o-ring 25 to advance o-ring 25 to seal as the door 21 moves away from hub 11. As pressure with closure assembly 10 is reduced and door 21 retracts, pressure within the groove 127 can pass through pressure bypass grooves 227 inwardly into hub bore 12, thereby retracting o-ring 25 into groove 127.

Figure 23:
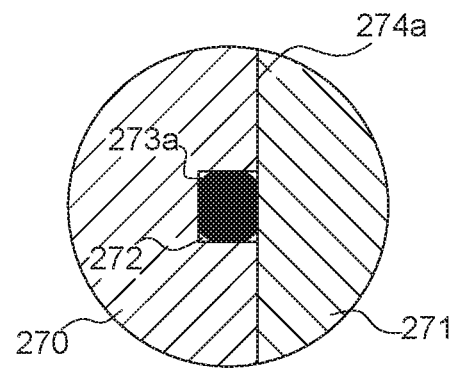
FIG. 23 is a close-up cross-section view depicting a prior art arrangement of a seal groove in a non-pressurized state.
Figure 24:
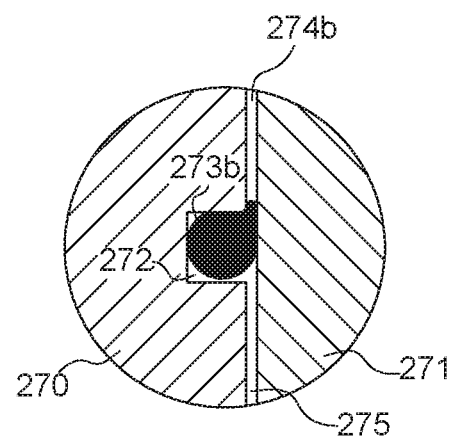
FIG. 24 is a close-up cross-section view depicting the prior art arrangement of the seal groove of FIG. 23 in a pressurized state.

In the prior art door seal arrangements as depicted in FIGS. 23 and 24, an o-ring seal 273a is disposed within a groove 272 in door 270 and retained by hub 271. As pressure acts upon door 270 and hub 271, door 270 advances away from hub 271 creating a separation allowing the o-ring seal 273b to flow into the void region 274b resulting in damage and ultimate failure of the o-ring seal. As pressure within void region 275 is reduced, the o-ring seal 237b may become entrapped between door 270 and hub 271 inhibiting the o-ring seal 237b retraction into groove 272.

Figure 22:
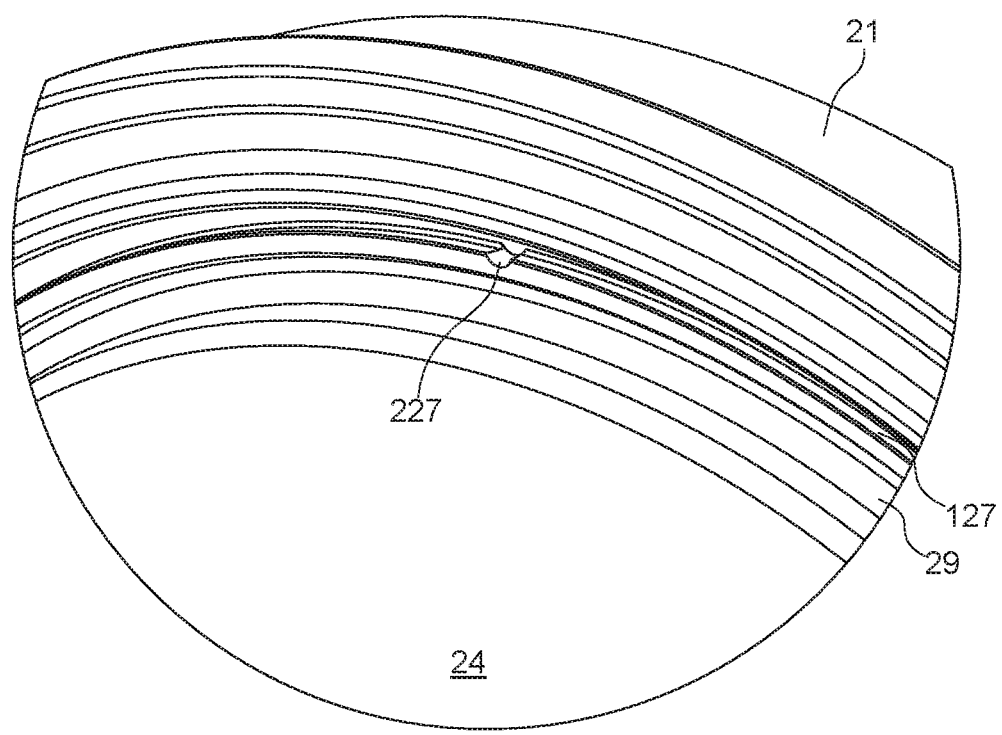
FIG. 22 is a close-up perspective view depicting Detail B of FIG. 6 showing a pressure bypass groove disposed thereon.
Figure 25:
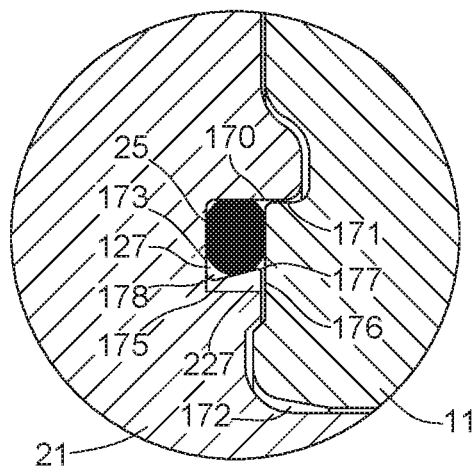
FIG. 25 is a close-up cross-section view depicting the seal arrangement of FIG. 21 in a non-pressurized state.
Figure 26:
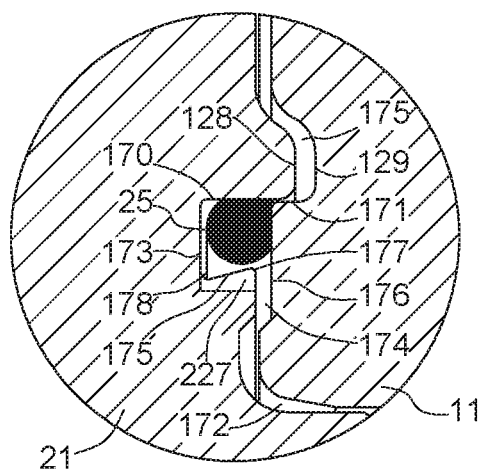
FIG. 26 is a close-up cross-section view depicting the seal arrangement of FIG. 25 in a pressurized state.

Referring to FIGS. 22, 25 and 26, in some embodiments, door 21 can comprise one or more pressure bypass grooves 227, each comprising a circular indentation on the inside surface of seal groove 127 on door 21, which can act as a means for pressure within hub bore 12 to enter void space 174 between groove 127 and o-ring seal 25 thereby pushing o-ring 25 against door surface 170 and hub surface 176.

As depicted in FIGS. 21 and 25, in the absence of system pressure, o-ring seal 25 is deformed within groove 127 by hub 11 as a result of the clamping action of clamp rings 41 and 42, resulting in seal contact on groove surfaces 170, 173 and 175 and hub surface 176. In some embodiments, groove 127 can comprise a trapezoidal cross-section configuration, as shown in FIGS. 25 and 26, whose sides are bounded by groove surfaces 170, 173 and 175 and hub surface 176 wherein corner void 178 in the acute angle formed by groove surfaces 173 and 175. When o-ring seal 25 is placed in groove 127, it can be kept in place by crest 177 of groove 127. In situations when the system pressure within hub 11 is negative, or a vacuum, corner void 178 can further provide room for o-ring seal 25 to move or be drawn into instead of being drawn into void space 174.

As shown in FIG. 26, as the pressure in void space 174 increases, resulting in protrusion 128 advancing axially from recess 129, pressure bypass groove 227 can allow pressure from within hub 11, traveling through passageway 172 disposed between hub 11 and door 12, to channel past groove contact surface 175 thereby allowing seal contact pressure to act on seal groove surface 170 and hub surface 176. As system pressure increases and the distance between protrusion 128 and recess 129 increases, pressure bypass groove 227 allows pressure to act on the posterior surface of the o-ring seal 25 thus maintaining contact with seal groove surface 170 and hub surface 176 and, thus, retaining system pressure therein. As the distance between protrusion 128 and recess 129 increases due to increases in system pressure, the movement of seal groove surface 170 and hub surface 171 remains axial and the separation distance therebetween remains constant thereby minimizing extrusion of the o-ring seal 25 into void region 175. In other words, even as system pressure causes door 12 to move away from hub 11, the overlapping configuration of protrusion 128 and recess 129 allows groove surface 170 to maintain an overlapping configuration with hub surface 171 wherein the distance separating the two is constant so as to prevent o-ring seal 25 from extending into void region 175. When the system pressure is removed, pressure bypass groove 227 can allow for the channeling of pressure within seal groove 127 to pass through void space 174 and passageway 172 to hub 11 thereby resulting in o-ring seal 25 to revert to the condition shown in FIG. 25 without damage, that is, to not being pinched between door 12 and hub 11 as shown in the prior art seal arrangement shown in FIG. 24.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The invention claimed is:

1. A closure device for a pressure vessel or a pipeline, the closure device comprising:
   a hub comprising a central opening configured to correspond to an opening in the pressure vessel or pipeline;
   a door configured to contact the hub and close access to the hub central opening;
   a hinge assembly operatively coupling the door to the hub;
   a split annular ring assembly operatively coupled attached to the hub and further comprising opposing ring sections configured to move between an open position to a closed position, the opposing ring sections each comprising an inner channel configured to engage corresponding flange elements disposed on both the door and the hub;
   an actuating mechanism configured to cause the split annular ring assembly to engage the flange elements thereby fastening the door to the hub, the actuating mechanism comprising:
      blocks attached to each of the opposing ring sections, each block comprising a longitudinal through-hole comprising an axis substantially parallel with a plane defined by the split annular ring assembly, wherein the longitudinal through-holes of the blocks substantially align with each other when the opposing ring sections are in the closed position,
      toggle linkages disposed on anterior and posterior sides of a first of the blocks operatively coupling the first of the blocks to a toggle handle, the toggle handle operatively coupling a second of the blocks to the toggle linkages, the toggle handle configured to move the opposing ring sections between the open and closed positions, and
      wherein the toggle linkages further comprise second longitudinal through-holes configured to align with the longitudinal through-holes of the blocks when the opposing ring sections are in the closed position;
   a locking pin configured to inhibit movement of the actuating mechanism when the actuating mechanism is in a locked position, the locking pin further comprising:
      a cylindrical pin comprising a diameter substantially corresponding to the longitudinal through-holes of the blocks and the toggle linkages, and
      a locking pin handle shaft comprising first and second ends, the first end operatively coupled to the cylindrical pin, the locking pin handle shaft substantially perpendicular to the cylindrical pin, and wherein the locking pin handle shaft is disposed through a closed slot disposed through a sidewall of a stem housing operatively coupled to the hub, wherein the locking pin handle shaft is constrained within the closed slot so that the locking pin is configured not to be removed from the stem housing when the actuating mechanism is operated to expand the split annular ring assembly into an unlocked position; and
   a pressure alert assembly operatively coupled to the hub, the pressure alert assembly configured to inhibit movement of the locking pin when the actuating mechanism is in the locked position.

2. The closure device as set forth in claim 1, further comprising a seal disposed between the door and hub.

3. The closure device as set forth in claim 1, wherein the hinge assembly further comprises:
   upper and lower blocks operatively coupled to the door, further comprising a plain pin and a threaded adjustment pin arrangement configured to manipulate a vertical location of the door in relation to the central opening;
   upper and lower flange plates operatively coupled to the upper and lower blocks on the door, and further comprising a gusset body disposed between the upper and lower flange plates;
   a hinge shaft; and
   a hinge adjustment assembly operatively coupling the upper and lower flange plates to the hinge shaft, the hinge adjustment assembly configured to manipulate a position of the door relative to the hub, wherein the hinge assembly can support the door and allow rotation of the door about the hinge shaft.

4. The closure device as set forth in claim 3, wherein the hinge shaft comprises an axis that ranges from being substantially vertical to substantially horizontal.

5. The closure device as set forth in claim 1, wherein the pressure alert assembly further comprises:
   a stem housing operatively coupled to the hub, the stem housing further enclosing a radial hole disposed through the hub to provide communication with an interior of the pressure vessel or the pipeline;
   a threaded bushing disposed in the radial hole, the threaded bushing configured to threadably receive an interrupted thread of a pressure alert stem, the threaded bushing further comprising a sealing surface to contact an o-ring seal disposed on the pressure alert stem; and
   a third longitudinal through-hole disposed through the annular external housing, the third longitudinal through-hole substantially aligned with the longitudinal through-holes of the blocks and with the second longitudinal through-hole when the opposing ring sections are in the closed position.

6. The closure device as set forth in claim 5, further comprising the locking pin disposed in the longitudinal through-holes when the opposing ring sections are in the closed position, the locking pin further configured to be clear of the radial hole when fully inserted into the longitudinal through-holes whereby the pressure alert stem prevents removal of the locking pin therefrom when the pressure alert stem is threaded into the threaded bushing.

7. The closure device as set forth in claim 6, wherein the interrupted thread is configured to close off communication to the interior of the pressure vessel or the pipeline when the pressure alert stem is fully threaded and seated in the threaded bushing, and to provide communication to the interior of the pressure vessel or the pipeline when the pressure alert stem is at least partially unthreaded from the threaded bushing.

8. The closure device as set forth in claim 5, wherein the pressure alert stem comprises a tee-shaped handle.

9. The closure device as set forth in claim 5, wherein the pressure alert assembly further comprises a key lock assembly comprising a retractable locking pin configured to engage a circumferential groove disposed around the pressure alert stem.

10. The closure device as set forth in claim 1, wherein the hinge assembly further comprises:
   upper and lower bearing blocks operatively coupled to the hub;
   a substantially vertical hinge shaft disposed between and at least partially through each of the upper and lower bearing blocks, the hinge shaft comprising an upper threaded end and a lower threaded end, each of the upper and lower threaded ends comprising upper and lower threaded fasteners, respectively, the threaded fasteners configured to retain the hinge shaft to the upper and lower bearing blocks;
   a hinge arm comprising a first end operatively coupled to the door, and a second end rotatably disposed about the hinge shaft;
   one or more stop collars disposed on the hinge shaft, the one or more stop collars configured to lock the second end of the hinge arm in a fixed position on the hinge shaft; and
   a hinge adjustment assembly configured to manipulate a vertical position of the door relative to the hub, wherein the hinge adjustment assembly can support the door, and wherein the hinge adjustment assembly further comprises the upper and lower threaded fasteners, wherein rotating the upper threaded fastener adjusts the vertical position of the door relative to the upper and lower bearing blocks, and wherein rotating the lower threaded fasteners locks or unlocks the vertical position of the door relative to the upper and lower bearing blocks.

11. The closure device as set forth in claim 10, wherein the hinge adjustment assembly is further configured to manipulate a parallel and concentric position of the door relative to the hub, wherein the hinge adjustment assembly can support the door, and wherein the upper and lower bearing blocks further comprise oppositely arranged screws, wherein rotating the oppositely arranged screws aligns the axis of the door relative to the axis of the hub colinearly in the closed position.

12. The closure device as set forth in claim 1, further comprising a locking pin handle operatively coupled to the second end of the locking pin handle shaft.

13. A closure device for a pressure vessel or a pipeline, the closure device comprising:
   a) a hub comprising a central opening configured to correspond to an opening in the pressure vessel or pipeline, the hub further comprising a concentric recess disposed around the central opening;
   b) a door configured to contact the hub and close access to the hub central opening, the door further comprising a concentric protrusion, the concentric protrusion configured to seat within the concentric recess when the door is fastened to the hub;
   c) a hinge assembly operatively coupling the door to the hub;
   d) a split annular ring assembly operatively coupled attached to the hub and further comprising opposing ring sections configured to move between an open position to a closed position, the opposing ring sections each comprising an inner channel configured to engage corresponding flange elements disposed on both the door and the hub;
   e) an actuating mechanism configured to cause the split annular ring assembly to engage the flange elements thereby fastening the door to the hub, the actuating mechanism comprising:
      blocks attached to each of the opposing ring sections, each block comprising a longitudinal through-hole comprising an axis substantially parallel with a plane defined by the split annular ring assembly, wherein the longitudinal through-holes of the blocks substantially align with each other when the opposing ring sections are in the closed position,
      toggle linkages disposed on anterior and posterior sides of a first of the blocks operatively coupling the first of the blocks to a toggle handle, the toggle handle operatively coupling a second of the blocks to the toggle linkages, the toggle handle configured to move the opposing ring sections between the open and closed positions, and
      wherein the toggle linkages further comprise second longitudinal through-holes configured to align with the longitudinal through-holes of the blocks when the opposing ring sections are in the closed position;
   f) a locking pin configured to inhibit movement of the actuating mechanism when the actuating mechanism is in a locked position, the locking pin further comprising:
      a cylindrical pin comprising a diameter substantially corresponding to the longitudinal through-holes of the blocks and the toggle linkages, and
      a locking pin handle shaft comprising first and second ends, the first end operatively coupled to the cylindrical pin, the locking pin handle shaft substantially perpendicular to the cylindrical pin, and wherein the locking pin handle shaft is disposed through a closed slot disposed through a sidewall of a stem housing operatively coupled to the hub, wherein the locking pin handle shaft is constrained within the closed slot so that the locking pin is configured not to be removed from the stem housing when the actuating mechanism is operated to expand the split annular ring assembly into an unlocked position; and
   g) an o-ring seal groove disposed concentrically on the door, the seal groove further comprising an o-ring seal disposed therein.

14. The closure device as set forth in claim 13, wherein the concentric protrusion is configured to maintain contact with concentric recess when system pressure within the hub urges the door away from the hub when the door is fastened to the hub.

15. The closure device as set forth in claim 13, wherein the o-ring seal is comprised of an elastomer material.

16. The closure device as set forth in claim 13, wherein the seal groove comprises a diameter less than that of the concentric protrusion.

17. The closure device as set forth in claim 16, wherein the seal groove is adjacent to the concentric protrusion.

18. The closure device as set forth in claim 13, wherein the seal groove is trapezoidal in cross-section.

19. The closure device as set forth in claim 13, further comprising a passageway providing communication between the seal groove and the central opening when the door is fastened to the hub.

20. The closure device as set forth in claim 19, further comprising at least one bypass groove providing communication between the seal groove and the passageway.

21. The closure device as set forth in claim 13, further comprising at least one bypass groove providing communication between the seal groove and the central opening when the door is fastened to the hub.

22. The closure device as set forth in claim 13, further comprising a locking pin handle operatively coupled to the second end of the locking pin handle shaft.

23. An improved pressure vessel or pipeline, the improvement comprising:
   a closure device welded or bolted thereto, wherein the closure device comprises:
      a hub comprising a central opening configured to correspond to an opening in the pressure vessel or pipeline;
      a door configured to contact the hub and close access to the hub central opening;
      a hinge assembly operatively coupling the door to the hub;
      a split annular ring assembly operatively coupled attached to the hub and further comprising opposing ring sections configured to move between an open position to a closed position, the opposing ring sections each comprising an inner channel configured to engage corresponding flange elements disposed on both the door and the hub;
      an actuating mechanism configured to cause the split annular ring assembly to engage the flange elements thereby fastening the door to the hub, the actuating mechanism comprising:
         blocks attached to each of the opposing ring sections, each block comprising a longitudinal through-hole comprising an axis substantially parallel with a plane defined by the split annular ring assembly, wherein the longitudinal through-holes of the blocks substantially align with each other when the opposing ring sections are in the closed position,
         toggle linkages disposed on anterior and posterior sides of a first of the blocks operatively coupling the first of the blocks to a toggle handle, the toggle handle operatively coupling a second of the blocks to the toggle linkages, the toggle handle configured to move the opposing ring sections between the open and closed positions, and
         wherein the toggle linkages further comprise second longitudinal through-holes configured to align with the longitudinal through-holes of the blocks when the opposing ring sections are in the closed position;
      a locking pin configured to inhibit movement of the actuating mechanism when the actuating mechanism is in a locked position, the locking pin further comprising:
         a cylindrical pin comprising a diameter substantially corresponding to the longitudinal through-holes of the blocks and the toggle linkages, and
         a locking pin handle shaft comprising first and second ends, the first end operatively coupled to the cylindrical pin, the locking pin handle shaft substantially perpendicular to the cylindrical pin, and wherein the locking pin handle shaft is disposed through a closed slot disposed through a sidewall of a stem housing operatively coupled to the hub, wherein the locking pin handle shaft is constrained within the closed slot so that the locking pin is configured not to be removed from the stem housing when the actuating mechanism is operated to expand the split annular ring assembly into an unlocked position; and
      a pressure alert assembly operatively coupled to the hub, the pressure alert assembly configured to inhibit movement of the locking pin when the actuating mechanism is in the locked position.

24. An improved pressure vessel or pipeline, the improvement comprising:
   a closure device welded or bolted thereto, the closure device comprising:
      a hub comprising a central opening configured to correspond to an opening in the pressure vessel or pipeline, the hub further comprising a concentric recess disposed around the central opening;
      a door configured to contact the hub and close access to the hub central opening, the door further comprising a concentric protrusion, the concentric protrusion configured to seat within the concentric recess when the door is fastened to the hub;
      a hinge assembly operatively coupling the door to the hub;
      a split annular ring assembly operatively coupled attached to the hub and further comprising opposing ring sections configured to move between an open position to a closed position, the opposing ring sections each comprising an inner channel configured to engage corresponding flange elements disposed on both the door and the hub;
      an actuating mechanism configured to cause the split annular ring assembly to engage the flange elements thereby fastening the door to the hub, the actuating mechanism comprising:
         blocks attached to each of the opposing ring sections, each block comprising a longitudinal through-hole comprising an axis substantially parallel with a plane defined by the split annular ring assembly, wherein the longitudinal through-holes of the blocks substantially align with each other when the opposing ring sections are in the closed position,
         toggle linkages disposed on anterior and posterior sides of a first of the blocks operatively coupling the first of the blocks to a toggle handle, the toggle handle operatively coupling a second of the blocks to the toggle linkages, the toggle handle configured to move the opposing ring sections between the open and closed positions, and
         wherein the toggle linkages further comprise second longitudinal through-holes configured to align with the longitudinal through-holes of the blocks when the opposing ring sections are in the closed position;
      a locking pin configured to inhibit movement of the actuating mechanism when the actuating mechanism is in a locked position, the locking pin further comprising:

a cylindrical pin comprising a diameter substantially corresponding to the longitudinal through-holes of the blocks and the toggle linkages, and a locking pin handle shaft comprising first and second ends, the first end operatively coupled to the cylindrical pin, the locking pin handle shaft substantially perpendicular to the cylindrical pin, and wherein the locking pin handle shaft is disposed through a closed slot disposed through a sidewall of a stem housing operatively coupled to the hub, wherein the locking pin handle shaft is constrained within the closed slot so that the locking pin is configured not to be removed from the stem housing when the actuating mechanism is operated to expand the split annular ring assembly into an unlocked position; and an o-ring seal groove disposed concentrically on the door, the seal groove further comprising an o-ring seal disposed therein.

* * * * *